United States Patent
Wright et al.

(10) Patent No.: US 12,238,222 B2
(45) Date of Patent: Feb. 25, 2025

(54) SYSTEMS AND METHODS FOR EFFICIENT AND SECURE PROCESSING, ACCESSING AND TRANSMISSION OF DATA VIA A BLOCKCHAIN NETWORK

(71) Applicant: nChain Licensing AG, Zug (CH)

(72) Inventors: Craig Steven Wright, London (GB); Owen Vaughan, London (GB); Jack Owen Davies, London (GB); Chloe Ceren Tartan, London (GB)

(73) Assignee: NCHAIN LICENSING AG, Zug (CH)

( * ) Notice: Subject to any disclaimer, the term of this patent is extended or adjusted under 35 U.S.C. 154(b) by 452 days.

(21) Appl. No.: 17/297,341

(22) PCT Filed: Nov. 14, 2019

(86) PCT No.: PCT/IB2019/059793
§ 371 (c)(1),
(2) Date: May 26, 2021

(87) PCT Pub. No.: WO2020/109908
PCT Pub. Date: Jun. 4, 2020

(65) Prior Publication Data
US 2022/0294608 A1  Sep. 15, 2022

(30) Foreign Application Priority Data

Nov. 27, 2018 (GB) ..................................... 1819284
Nov. 27, 2018 (GB) ..................................... 1819286
(Continued)

(51) Int. Cl.
*H04L 9/08* (2006.01)
*G06F 16/23* (2019.01)
(Continued)

(52) U.S. Cl.
CPC ........ *H04L 9/3247* (2013.01); *G06F 16/2379* (2019.01); *G06F 21/6218* (2013.01);
(Continued)

(58) Field of Classification Search
CPC ....... H04L 9/3247; H04L 9/08; H04L 9/0825; H04L 9/0836; H04L 9/30; H04L 9/3033;
(Continued)

(56) References Cited

U.S. PATENT DOCUMENTS

| 9,298,806 | B1 * | 3/2016 | Vessenes ............... G06F 16/244 |
| 10,050,779 | B2 | 8/2018 | Alness et al. |

(Continued)

FOREIGN PATENT DOCUMENTS

| CN | 102668497 A | 9/2012 |
| CN | 105469510 A | 4/2016 |

(Continued)

OTHER PUBLICATIONS

Massimo et al; "An analysis of Bitcoin OP-Return metadata", 2017, pp. 1-18. (Year: 2017).*

(Continued)

*Primary Examiner* — Yonas A Bayou
(74) *Attorney, Agent, or Firm* — Tarolli, Sundheim, Covell & Tummino LLP

(57) ABSTRACT

The invention provides improved methods and systems for storing, sharing retrieving, writing and accessing data (content) on a blockchain. The invention may form part of a protocol for storing, searching and accessing the data. An embodiment of the invention comprises the step of processing at least one blockchain transaction (Tx) comprising: a protocol flag; a discretionary public key (DPK); and a discretionary transaction ID (DTx ID). These are discretionary in the sense that they are not required as part of the underlying blockchain protocol but in accordance with the
(Continued)

| TxID | |
|---|---|
| Inputs | Outputs |
| $<Sig\ P><P>$ | OP_RETURN <Metanet Flag> <Attribute 1> <Attribute 2> |
| | <Content 1> OP_DROP $<H(P')>$ [CheckSig $P'$] | present invention. This combination of features enables portions of data to be identified, retrieved and shared on a blockchain, and also to be linked/associated with one another when provided in a plurality of transactions. It enables a graph or tree-like structure to be constructed, which reflects the hierarchical relationships between portions of data, facilitating their processing, searching and sharing.

20 Claims, 14 Drawing Sheets

(30) Foreign Application Priority Data

| Nov. 27, 2018 | (GB) | ................................. | 1819290 |
|---|---|---|---|
| Nov. 27, 2018 | (GB) | ................................. | 1819291 |
| Nov. 27, 2018 | (GB) | ................................. | 1819293 |
| Nov. 27, 2018 | (GB) | ................................. | 1819297 |
| Nov. 27, 2018 | (GB) | ................................. | 1819299 |

(51) Int. Cl.

| G06F 21/62 | (2013.01) |
|---|---|
| G06Q 20/38 | (2012.01) |
| H04L 9/30 | (2006.01) |
| H04L 9/32 | (2006.01) |
| H04L 9/00 | (2022.01) |

(52) U.S. Cl.
CPC ... *G06Q 20/38215* (2013.01); *G06Q 20/3827* (2013.01); *G06Q 20/3829* (2013.01); *H04L 9/08* (2013.01); *H04L 9/0825* (2013.01); *H04L 9/0836* (2013.01); *H04L 9/30* (2013.01); *H04L 9/3033* (2013.01); *H04L 9/3073* (2013.01); *H04L 9/3239* (2013.01); *H04L 9/3242* (2013.01); *H04L 9/3249* (2013.01); *H04L 9/50* (2022.05); *H04L 2209/56* (2013.01)

(58) Field of Classification Search
CPC ... H04L 9/3073; H04L 9/3239; H04L 9/3242; H04L 9/3249; G06F 16/2379; G06F 21/6218; G06Q 20/38215; G06Q 20/3827; G06Q 20/3829
See application file for complete search history.

(56) References Cited

U.S. PATENT DOCUMENTS

| 10,320,569 | B1 | 6/2019 | Wentz et al. | |
|---|---|---|---|---|
| 11,062,042 | B1 | 7/2021 | McKervey et al. | |
| 11,831,749 | B1 | 11/2023 | Fisher et al. | |
| 11,924,323 | B2 | 3/2024 | Vouk et al. | |
| 11,924,360 | B2 | 3/2024 | Yoshihama et al. | |
| 2007/0112818 | A1* | 5/2007 | Sastry | G06F 16/2448 |
| 2008/0002825 | A1 | 1/2008 | Gueron et al. | |
| 2015/0269570 | A1* | 9/2015 | Phan | G06Q 20/3276 |
| | | | | 705/71 |
| 2015/0310424 | A1* | 10/2015 | Myers | G06Q 20/401 |
| | | | | 705/69 |
| 2016/0027015 | A1 | 1/2016 | Redpath | |
| 2016/0162897 | A1 | 6/2016 | Feeney | |
| 2016/0342977 | A1 | 11/2016 | Lam | |
| 2016/0358165 | A1 | 12/2016 | Maxwell | |
| 2017/0031874 | A1 | 2/2017 | Boudville | |
| 2017/0116693 | A1* | 4/2017 | Rae | G06Q 50/184 |
| 2017/0177898 | A1 | 6/2017 | Dillenberger | |
| 2017/0187535 | A1 | 6/2017 | Middleton et al. | |
| 2017/0236123 | A1 | 8/2017 | Ali et al. | |
| 2017/0324711 | A1 | 11/2017 | Feeney et al. | |
| 2017/0330179 | A1* | 11/2017 | Song | G06Q 20/3823 |
| 2018/0025442 | A1 | 1/2018 | Isaacson et al. | |
| 2018/0053161 | A1 | 2/2018 | Bordash et al. | |
| 2018/0060596 | A1 | 3/2018 | Hamel et al. | |
| 2018/0060600 | A1 | 3/2018 | Hamel et al. | |
| 2018/0062835 | A1 | 3/2018 | Hamel et al. | |
| 2018/0091316 | A1 | 3/2018 | Stradling et al. | |
| 2018/0097635 | A1 | 4/2018 | Moses | |
| 2018/0117446 | A1 | 5/2018 | Tran et al. | |
| 2018/0165588 | A1 | 6/2018 | Saxena et al. | |
| 2018/0197159 | A1 | 7/2018 | Sheerin | |
| 2018/0225008 | A1 | 8/2018 | Naqvi | |
| 2018/0241565 | A1 | 8/2018 | Paolini-Subramanya et al. | |
| 2018/0255090 | A1 | 9/2018 | Kozloski et al. | |
| 2018/0287805 | A1 | 10/2018 | Ramathal et al. | |
| 2018/0322491 | A1 | 11/2018 | Madisetti et al. | |
| 2018/0323974 | A1 | 11/2018 | Gao et al. | |
| 2018/0332054 | A1 | 11/2018 | Ford | |
| 2018/0336286 | A1 | 11/2018 | Shah | |
| 2018/0336552 | A1 | 11/2018 | Bohli et al. | |
| 2018/0337770 | A1 | 11/2018 | Bathen et al. | |
| 2018/0337847 | A1 | 11/2018 | Li et al. | |
| 2018/0337879 | A1 | 11/2018 | Golan | |
| 2019/0005470 | A1* | 1/2019 | Uhr | H04L 9/3239 |
| 2019/0028276 | A1 | 1/2019 | Pierce et al. | |
| 2019/0102779 | A1 | 4/2019 | Ma et al. | |
| 2019/0166105 | A1 | 5/2019 | Romain | |
| 2019/0188700 | A1 | 6/2019 | August et al. | |
| 2019/0207757 | A1 | 7/2019 | Hennebert | |
| 2019/0213333 | A1 | 7/2019 | Williams et al. | |
| 2019/0361917 | A1 | 11/2019 | Tran et al. | |
| 2020/0014301 | A1* | 1/2020 | Telefus | G11C 27/024 |
| 2020/0014527 | A1 | 1/2020 | Subramaniam | |
| 2020/0026834 | A1* | 1/2020 | Vimadalal | H04L 9/0825 |
| 2020/0044860 | A1* | 2/2020 | Zhang | H04L 9/3093 |
| 2020/0098042 | A1 | 3/2020 | Hoshizuki | |
| 2020/0143014 | A1 | 5/2020 | LeBeau et al. | |
| 2020/0159696 | A1 | 5/2020 | Adluri et al. | |
| 2021/0075616 | A1 | 3/2021 | Mawdsley et al. | |
| 2023/0245247 | A1* | 8/2023 | Xiong | G06Q 20/123 |
| | | | | 705/69 |
| 2023/0281606 | A1 | 9/2023 | Jakobsson et al. | |

FOREIGN PATENT DOCUMENTS

| CN | 106097030 A | 11/2016 |
|---|---|---|
| CN | 106533661 A | 3/2017 |
| CN | 106682457 A | 5/2017 |
| CN | 107249046 A | 10/2017 |
| CN | 107273556 A | 10/2017 |
| CN | 107317842 A | 11/2017 |
| CN | 107615317 A | 1/2018 |
| CN | 107682308 A | 2/2018 |
| CN | 107730225 A | 2/2018 |
| CN | 107924389 A | 4/2018 |
| CN | 108416578 A | 8/2018 |
| CN | 108616539 A | 10/2018 |
| CN | 108632268 A | 10/2018 |
| CN | 108646983 A | 10/2018 |
| CN | 108664223 A | 10/2018 |
| CN | 108683509 A | 10/2018 |
| CN | 108712429 A | 10/2018 |
| CN | 108764904 A | 11/2018 |
| CN | 108780556 A | 11/2018 |
| CN | 108781161 A | 11/2018 |
| CN | 108876370 A | 11/2018 |
| CN | 108885741 A | 11/2018 |
| EP | 3295362 B1 | 7/2018 |
| EP | 3364351 A1 | 8/2018 |
| GB | 2548802 A | 10/2017 |
| JP | 2007336464 A | 12/2007 |
| JP | 2008514079 A | 5/2008 |
| JP | 2018098564 A | 6/2018 |
| JP | 2018152717 A | 9/2018 |
| TW | 201837797 A | 10/2018 |
| WO | 2016186873 A1 | 11/2016 |
| WO | 2017007806 A1 | 1/2017 |
| WO | 2017145008 A1 | 8/2017 |
| WO | 2017145016 A1 | 8/2017 |
| WO | 2017170912 A1 | 10/2017 |

(56) References Cited

FOREIGN PATENT DOCUMENTS

| WO | 2018020370 | A1 | 2/2018 |
|---|---|---|---|
| WO | 2018020377 | A1 | 2/2018 |
| WO | 2018043865 | A2 | 3/2018 |
| WO | 2018059334 | A1 | 4/2018 |
| WO | 2018060951 | A1 | 4/2018 |
| WO | 2018145168 | A1 | 8/2018 |
| WO | 2018213672 | A1 | 11/2018 |

OTHER PUBLICATIONS

The Metanet Technical summary "A Blockchain-based Internet." 18 pages. (Year: 2019).*
The Intellectual Property of India, "Examination Report" in Application No. 202147023412, Jan. 4, 2023, 7 pages.
The Intellectual Property Office of India, "Examination Report" in Applicaiton No. 202147023427, Jan. 5, 2023, 7 pages.
The Intellectual Property Office of Taiwan, "Non-Final Rejection" in Application No. 108142769, dated Dec. 29, 2022, 9 pages.
Intellectual Property Office of India, "Examination Report" in Application No. 202147023417, Jan. 6, 2023, 5 pages.
Kokoris-Kogias et al., "Calypso: Private Data Management for Decentralized Ledgers" Proceedings of the VLDB Endowment, vol. 14, Issue 4, Dec. 2020, 19 pages.
Intellectual Property Office of India, "Examination Report" in Applicaiton No. 202147023529, Jan. 5, 2023, 7 pages.
The Intellectual Property Office of India, "Examination Report" in Applicatio No. 202147023538, Dec. 29, 2022, 6 pages.
The Intellectual Property Office of India, "Examination Report" in Application No. 202147023623, Jan. 1, 2023, 7 pages.
Taiwan Intellectual Property Office, "Non-Final Rejection" in Application No. 108142755, dated Dec. 29, 2022, 14 pages.
The Intellectual Property of India, "Examination Report" in Application No. 202147023451, Dec. 23, 2022, 6 pages.
Ali et al., "Blockstack: A Global Naming and Storage System Secured by Blockchains," 2016 USENIX Annual Technical Conference, Jun. 22-24, 2016, 15 pages.
Antonopoulos, "Mastering Bitcoin—Unlocking Digital Cryptocurrencies," O'Reilly Media, Inc., Dec. 20, 2014, 282 pages.
Bartoletti et al., "An Analyis of Bitcoin OP_Return Metadata, " Feb. 2017, 18 pages.
Billstrom et al., "Video Integrity Through Blockchain Technology," Master's Thesis, Feb. 8, 2017, 96 pages.
Bitcoin Wiki, "Category:Block Chain Browsers," Nov. 23, 2018 edit, Retrieved from https://en.bitcoin.it/w/index.php?title=Category:Block_chain_browsers&oldid=65913 on Mar. 16, 2020, 2 pages.
Camenisch et al., "Practical UC-Secure Delegatable Credentials with Attributes and Their Application to Blockchain," Oct. 2017, 22 pages.
Faisal et al., "The Evolution of Embedding Metadata in Blockchain Transactions," Jun. 18, 2018, 9 pages.
International Search Report and Written Opinion mailed Feb. 14, 2020, Patent Application No. PCT/IB2019/060226, 12 pages.
International Search Report and Written Opinion mailed Feb. 5, 2020, Patent Application No. PCT/IB2019/059807, 10 pages.
International Search Report and Written Opinion mailed Feb. 6, 2020, Patent Application No. PCT/IB2019/059808, 24 pages.
International Search Report and Written Opinion mailed Feb. 6, 2020, Patent Application No. PCT/IB2019/059809, 10 pages.
International Search Report and Written Opinion mailed Jan. 29, 2020, Patent Application No. PCT/IB2019/059791, 11 pages.
International Search Report and Written Opinion mailed Jan. 29, 2020, Patent Application No. PCT/IB2019/059793, 11 pages.
International Search Report and Written Opinion mailed Jan. 29, 2020, Patent Application No. PCT/IB2019/059795, 10 pages.
International Search Report and Written Opinion mailed Mar. 23, 2020, Patent Application No. PCT/IB2019/059803, 13 pages.
Kokoris-Kogias et al., "Calypso: Auditable Sharing of Private Data Over Blockchains," Aug. 6, 2018, 17 pages.
Morishima et al., "Accelerating Blockchain Search of Full Nodes Using GPUs," 26th Euromicro International Conference on Parallel, Distributed and Network-based Proceessing (PDP), Mar. 2018, 6 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
Tiernolan et al., "Alt Chains and Atomic Transfers," Bitcoin Forum, https://bitcointalk.org/index.php?topic=193281.msg2224949#msg2224949, May 7, 2013, 17 pages.
UK IPO Search Report mailed May 1, 2019, Patent Application No. GB1819297.1, 4 pages.
UK IPO Search Report mailed May 15, 2019, Patent Application No. GB1819299.7, 6 pages.*
UK IPO Search Report mailed May 16, 2019, Patent Application No. GB1819284.9, 5 pages.
UK IPO Search Report mailed May 20, 2019, Patent Application No. GB1819290.6, 7 pages.
UK IPO Search Report mailed May 30, 2019, Patent Application No. GB1819286.4, 8 pages.
UK IPO Search Report mailed May 30, 2019, Patent Application No. GB1819291.4, 8 pages.
UK IPO Search Report mailed May 30, 2019, Patent Application No. GB1819293.0, 8 pages.
Vaughan, "Rabin Signatures in Bitcoin Cash," nChain, Sep. 2018, 3 pages.
Wright, "Tokens, Atomic Swaps, and Bitcoin Payments," nChain presentation, Jun. 2018, 19 pages.
Intellectual Property Office of India, "Examination Report" in Application No. 202147023608, Jan. 13, 2023, 6 pages.
State Intellectual Property Office of China, "Office Action" in application No. 201980078214.1, Oct. 26, 2023, 14 pages.
Wei-Tek, Tsai, et al., "Big Data-Oriented Blockchain for Clearing System", China Academic Journal Publishing House, Dec. 5, 2017, 14 pages.
State Intellectual Property Office of China, "First Notice of Examination" in Application No. 201980078242.3, Oct. 27, 2023, 16 pages.
Taiwan Patent Office, "Office Action and Search Report" in application No. 108142774, Dec. 14, 2023, 14 pages.
State Intellectual Property Office of China, "Office Action with Search Report" in Application No. 201980078378.4, Nov. 7, 2023, 18 pages.
Japan Patent Office, "Office Action" in Application No. 2021-527844, Dec. 26, 2023, 14 pages.
European Patent Office, "Communication Pursuant to Article 94(3) EPC" in application No. 19 806 335.6-1218, Oct. 24, 2023, 5 pages.
Sward, et al., "Data Insertion in Bitcoin's Blockchain Ledger", Apr. 3, 2018, vol. 3, 23 pages.
European Patent Office, "Communication Pursuant to Article 94(3) EPC", Application No. 19 816 462.6-1218, Nov. 6, 2023, 4 pages.
Bragagnolo et al., "Ethereum Query Language," IEEE International Workshop on Emerging Trends in Software Engineering for Blockchain, May 27, 2018, 8 Pages.
Japan Patent Office, "Office Action" Application No. 2021-527846, Nov. 28, 2023, 10 pages.
Japan Patent Office, "Office Action" Application No. 2021-527870, Nov. 28, 2023, 8 pages.
Japan Patent Office, "Office Action" Application No. 2021-527869, Dec. 5, 2023, 14 pages.
El Bansarkhani, Rachid et al., "PQChain: Strategic Design Decisions for Didtributed Ledger Technologies Against Future Threats", IEEE Security & Privacy, vol. 16, Issue 4, Jul.-Aug. 2018, 9 pages.
Ghizlane, Moukhliss, et al., A Security Policy for Access Control to Academic Services Based on Public Key Infrastructures and Smart Cards, 2018 6th International Conference on Multimedia Computing and Systems (ICMCS), 6 pages.
Japan Patent Office, "Notice of Reasons for Rejection" in applicaiton No. 2021-527868, Nov. 21, 2023, 12 pages.
Fuchita, Yasuyuki, "Special Feature: Innovation and Finance—Blockchain and Financial Transaction Innovation", Nomura capital

(56) References Cited

OTHER PUBLICATIONS markets quarterly, Japan, Nomura Institute of Capital Markets Research, Nov. 1, 2015, vol. 19, No.2 (consecutive number of issue 74), 30 pages.
Kaneko, Yusuke, et al., "A Design of Interest-rate Recordable Cryptocurrency Management Program", IPSJ SIG Technical Report, computer security (CSEC), Japan, Information Processing Society of Japan (IPSJ) [online], Jul. 18, 2018, vol. 2018-CSEC-082, No. 2, 9 pages.
Japan Patent Office, "Office Action" Application No. 2021-527848, Nov. 21, 2023, 14 pages.
Intellectual Property Office Ministry of Economic Affairs, "Notice of Allowance" in Application No. 108142769, dated Apr. 20, 2023, 1 page.
Japan Patent Office, "Office Action" in applicaiton No. 2021-527843, Nov. 7, 2023, 6 pages.
Taiwan Intellectual Property Office, "Search Report" in Application No. 108142772, Mar. 6, 2023, 1 page.
European Patnet Office, "Communication Pursuant to Article 94(3) EPC" in Application No. 19 832 724.9-1218, Nov. 7, 2023, 5 pages.
European Patent Office, "Communication Pursuant to Article 94(3) EPC" in application No. 19 806 336.4-1218, Oct. 24, 2023, 4 pages.
European Patent Office, "Communication Pursuant to Article 94(3) EPC", in application No. 19 806 334.9 - 1218, Oct. 24, 2023, 5 pages.
Japan Patent Office, "Office Action" in application No. 2021-527845, Nov. 7, 2023, 8 pages.
European Patent Office, "Communication Pursuant to Article 94(3) EPC", in application No. 19 806 333.1 - 1218, dated Oct. 13, 2023, 3 pages.
Taiwan Patent Office, "Search Report" in application No. 108142754, Nov. 2, 2023, 7 pages.
Panchamia, et al., "Passport, VISA and Immigration Management Using Blockchain" 2017 23rd Annual Conference on Advanced Computing and Communications, 2018, 10 pages.
Vigil, et al., "Blockchain Over Transaction System" Proceedings of the International Conference on Communication and Electronics Systems (ICCES 2018) IEEE, 2018, 7 pages.
Isirova, et al., "Decentralized Public Key Infrastructure Development Principles" The 9th IEEE International Conference on Dependable Systems, Services and Technologies, DESSERT May 2018, 6 pages.
Taiwan Patent Office, "Office Action" in Application No. 108142773, Feb. 2, 2023, 13 pages.
Intellectual Property Office Ministry of Economic Affairs, "Notie of Allowance" in application No. 108142773, dated Apr. 21, 2023, 1 page.
Moser et al., "Anonymous Alone? Measuring Bitcoin's Second-Generation Anonymization Techniques", 2017 IEEE European Symposium on Security and Privacy Workshops, 10 pages.
Herlihy, Maurice, "Atomic Cross-Chain Swaps", PODC'18, Egham, United Kingdom, May 18, 2018, 10 pages.
Taiwan Patent Office, "Search Report" in Application No. 108142754, Feb. 23, 2024, 2 pages.
Taiwan Patent Office, "Office Action" in Application No. 108142754, Feb. 23, 2024, 6 pages.
Kalamsyah, Sony Adan et al., "Digital Contract Using Block Chaining and Elliptic Curve Based Digital Signature", 2018, 6th International Conference on Information and Communication Technology IEEE, 6 pages.
Sudhan, Amool et al., "Employability of Blockchain Technology in Defence Applications", 2017 International Conference on Intelligent Sustainable Systems (ICISS) IEEE, 8 pages.
Kouzinopoulos, Charalampos S. et al., "Implementing a Forms of Consent Smart Contract on an IoT-based Blockchain to Promote User Trust", 2018, Innovations in Intelligent Systems and Applications (INISTA) IEEE, 6 pages.
Udokwu, Chibuzor et al., "The State of the Art for Blockchain-Enabled Smart-Contract Applications in the Organization", 2018 Ivannikov Ispras Open Conference (ISPRAS), IEEE, 8 pages.
State Intellectual Property Office of China "Office Action" in Application No. 201980078242.3, Apr. 28, 2024, 10 pages.
State Intellectual Property Office of China "Search Report" in Application No. 201980078242.3, Apr. 23, 2024, 4 pages.
State Intellectual Property Office of China, "Office Action" in Application No. 201980078214. 1 Apr. 26, 2024, 10 pages.
State Intellectual Property Office of China, "Second Office Action" in Application No. 20190078378.4, May 1, 2024, 12 pages.
Taiwan Patent Office, "Office Action", in Application No. 108142771, Jan. 31, 2023, 13 pages.
Taiwan Patent Office, "Office Action" in Application No. 108142774, May 28, 2024, 12 pages.
Delgado-Segura et al., "Bitcoin Private Key Locked Transactions", Cryptology Archive Paper, Dec. 2016, 8 pages.
State Intellectual Property Office of China, "Office Action with Search Report" in Application No. 201980078428.9, Jun. 20, 2024, 12 pages.
State Intellectual Property Office of China, "Office Action with Search Report" in Application No. 201980078225, Jun. 20, 2024, 12 pages.
State Intellectual Property Office of China, "First Examination Notice with Search Report" in Application No. 201980078427.4, Jun. 28, 2024, 14 pages.
State Intellectual Property Office of China, "First Examination Opinion Notice with Search Report" in Application No. 20190078377, Jun. 26, 2024, 16 pages.
State Intellectual Property Office of China, "First Examination Notice with Search Report" in Application No. 201980078226.4, Jun. 26, 2024, 16 pages.
Taiwan Patent Office, "Office Action with Search Report" in Application No. 112149530, Jul. 16, 2024, 9 pages.
Taiwan Patent Office, "Office Action" in Application No. 108142754, Aug. 1, 2024, 8 pages.
State Intellectual Property Office of China, "Rejection Decision" in Application No. 201980078214.1, Jul. 30, 2024, 12 pages.

* cited by examiner

| TxID | |
|---|---|
| Inputs | Outputs |
| $<Sig\ P><P>$ | OP_RETURN <Metanet Flag> <Attribute 1> <Attribute 2> |
| | <Content 1> OP_DROP $<H(P')>$ [CheckSig $P'$] |

Figure 1

| TxID | |
|---|---|
| Inputs | Outputs |
| $<Sig\ P><P>$ <Content 1> OP_DROP | OP_RETURN <Metanet Flag> <Attribute 1> <Attribute 2> |

Figure 2

| $TxID_1$ | |
|---|---|
| Inputs | Outputs |
| $<Sig\ P><P>$ | OP_RETURN <Metanet Flag> <Attribute 1,1 = Content name><br><Attribute 1,2 = Recombination scheme><br><Attribute 1,3 = Content chunk index 1> |
| | <Content chunk 1> OP_DROP $<H(P')>$ [CheckSig $P'$] |

| $TxID_2$ | |
|---|---|
| Inputs | Outputs |
| $<Sig\ P><P>$ | OP_RETURN <Metanet Flag> <Attribute 2,1 = Content name><br><Attribute 2,2 = Recombination scheme><br><Attribute 2,3 = Content chunk index 2> |
| | <Content chunk 2> OP_DROP $<H(P')>$ [CheckSig $P'$] |

Figure 3

| $TxID_{Bob}$ | | | |
|---|---|---|---|
| Inputs | | Outputs | |
| Value | Script | Value | Script |
| $x$ | $<Sig\ P_B><P_B>$ | $x$ | [Private Key Puzzle $P_1, r_0$] [CheckSig $P_A$] |

Figure 4

| TxID_Alice |||||
|---|---|---|---|---|
| Inputs || Outputs ||
| Value | Script | Value | Script |
| $x$ | $<Sig\ P_A>\ <P_A>\ <Sig\ P_1, r_0>\ <P_1>$ | $x$ | [CheckSig $P_A$] |

Figure 5

| | Use | Alice | Bob |
|---|---|---|---|
| Token Issuance | Purchase of 10 tokens | $I_{Alice} = k$ | $I_{Bob} = H^{10}(Y)$ |
| Token redemption | Redeem token 1 | $X_1$ | $T_1 = H^9(Y)$ |
| | Redeem token 2 | $X_2$ | $T_2 = H^8(Y)$ |
| | ... | ... | ... |
| | Redeem token 10 | $X_{10}$ | $T_{10} = Y$ |

Figure 6

| $TxID_{Alice}$ | | | |
|---|---|---|---|
| Inputs | | Outputs | |
| Value | Script | Value | Script |
| $x$ | $< Sig\ P_A> <P_A>$ | $x$ | [Hash Puzzle $H(I_{Alice})$] [Hash Puzzle $H(I_{Bob})$] [CheckSig $P_B$] |

Phase 1.1 (Alice to Bob):

Figure 7

| $TxID_{Bob}$ | | | |
|---|---|---|---|
| Inputs | | Outputs | |
| Value | Script | Value | Script |
| $10 + x$ | $< Sig\ P_B> <P_B>$ | $10 + x$ | [Hash Puzzle $H(I_{Alice})$] [Hash Puzzle $H(I_{Bob})$] [CheckSig $P_A$] |

Phase 1.2 (Bob to Alice):

Figure 8

Phase 2.1 (Bob to Alice):

| $TxID_{Bob}$ | | | |
|---|---|---|---|
| Inputs | | Outputs | |
| Value | Script | Value | Script |
| $x$ | $< Sig\ P_B> <P_B>$ | $x$ | [Hash Puzzle $H(X_1)$] [Hash Puzzle $H(T_1)$] [CheckSig $P_A$] |

Figure 9

Phase 2.2 (Alice to Bob):

| $TxID_{Alice}$ | | | |
|---|---|---|---|
| Inputs | | Outputs | |
| Value | Script | Value | Script |
| $x$ | $< Sig\ P_A> <P_A>$ | $x$ | [Hash Puzzle $H(X_1)$] [Hash Puzzle $H(T_1)$] [CheckSig $P_B$] |

Figure 10

Phase 2.3 (Alice to Alice):

| $TxID_{Alice}$ | | | |
|---|---|---|---|
| Inputs | | Outputs | |
| Value | Script | Value | Script |
| $x$ | $< Sig\ P_A > <P_A> <T_1> <X_1>$ | $x$ | [CheckSig $P_A$] |

Figure 11

Phase 2.4 (Bob to Bob):

| $TxID_{Bob}$ | | | |
|---|---|---|---|
| Inputs | | Outputs | |
| Value | Script | Value | Script |
| $x$ | $< Sig\ P_B > <P_B> <T_1> <X_1>$ | $x$ | [CheckSig $P_B$] |

Figure 12

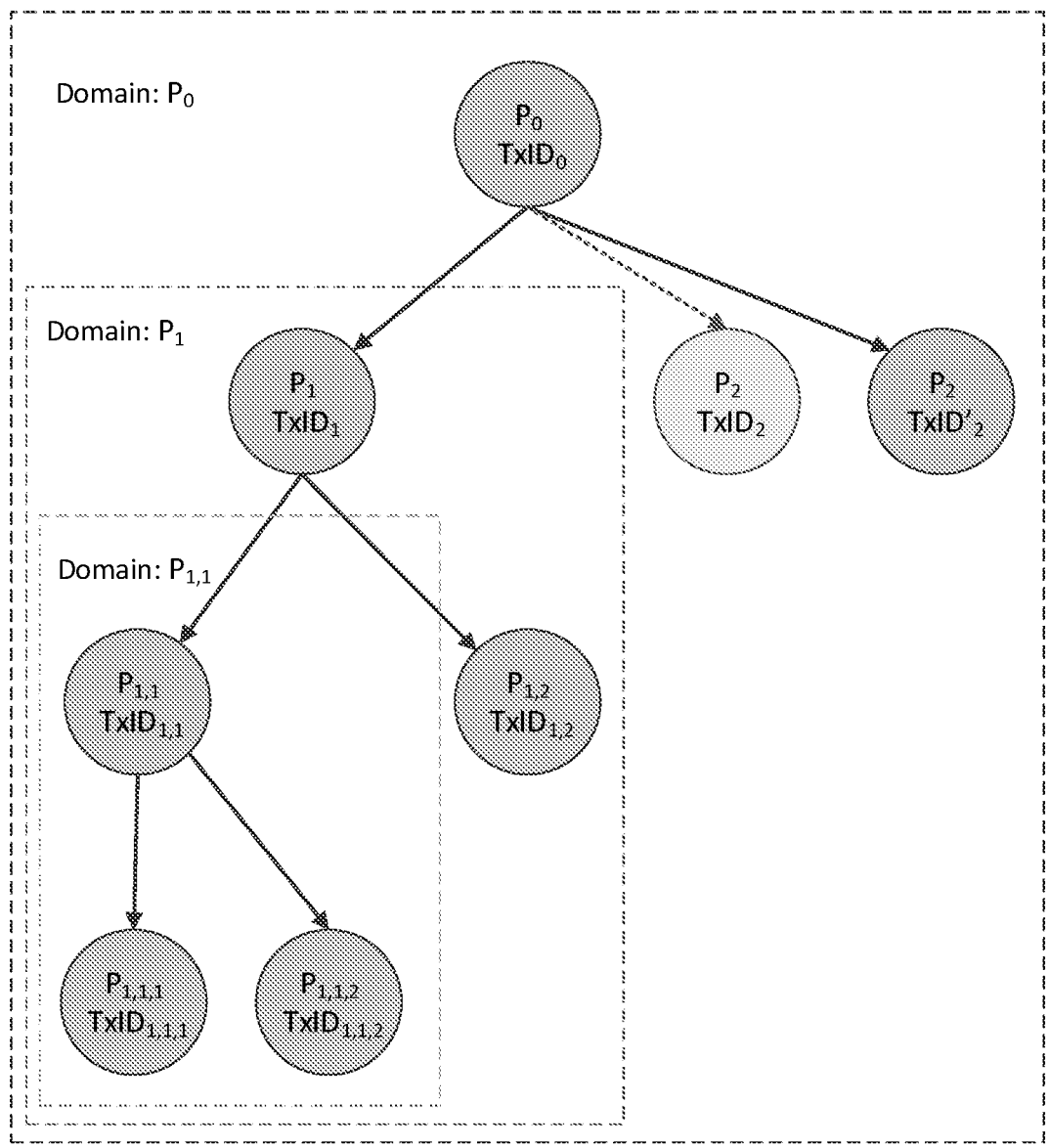
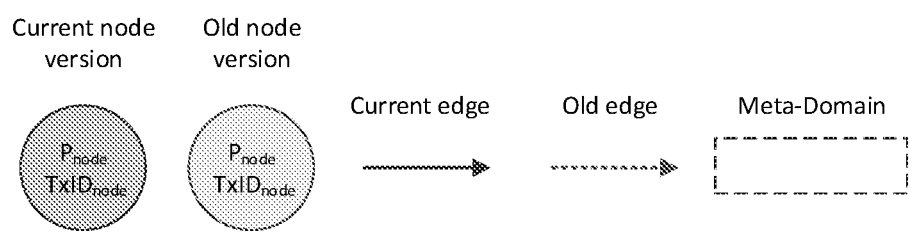
Figure 13

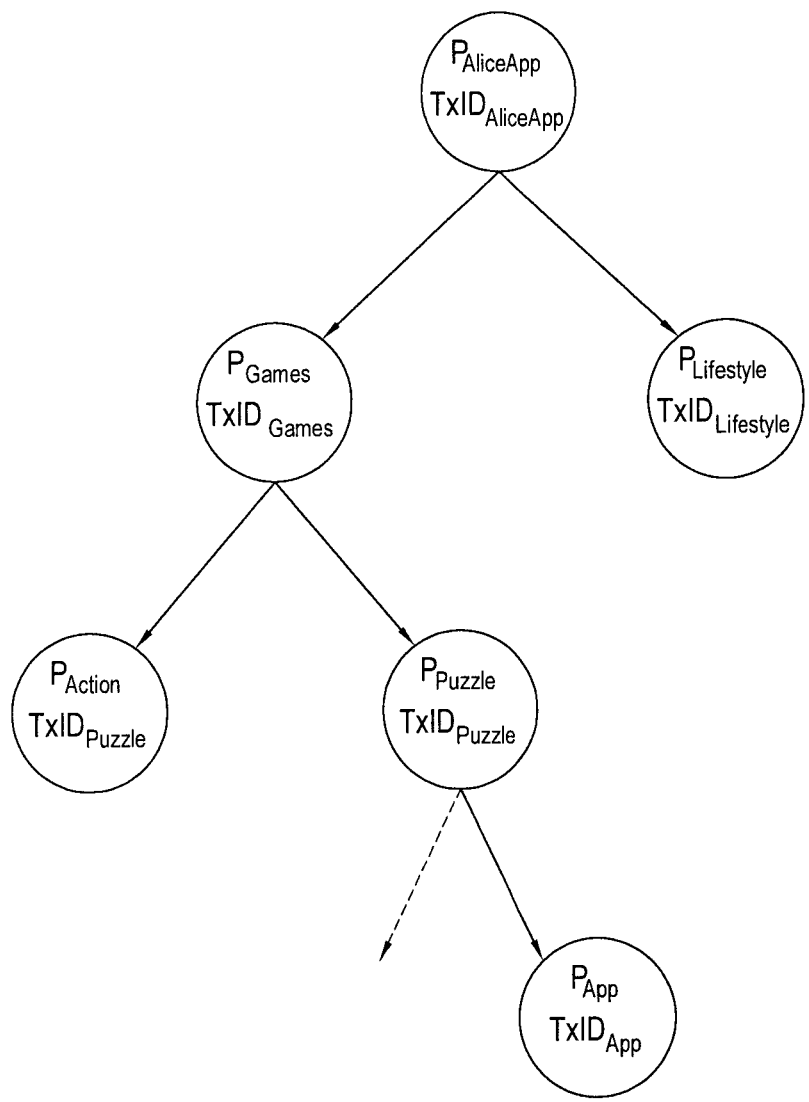
| Current node version | Old node version | Current edge | Old edge |
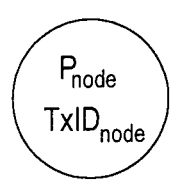 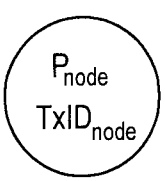 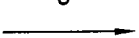 
Fig. 18

SYSTEMS AND METHODS FOR EFFICIENT AND SECURE PROCESSING, ACCESSING AND TRANSMISSION OF DATA VIA A BLOCKCHAIN NETWORK

This invention relates generally to improvements for data communication and exchange across an electronic network, and in particular a peer-to-peer network such as a blockchain network. It relates to data storage, access, retrieval and processing, and more particularly to such data-related activities on a blockchain. The invention is particularly suited, but not limited to, use in processing data in a manner similar to that provided by web sites and web pages but using the blockchain as an underlying mechanism or platform rather than web server(s). Thus, the invention provides a secure, efficient, cryptographically-enforced, alternative infrastructure for data processing and transfer.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "user" may refer herein to a human or a processor-based resource. "Bitcoin" as used herein includes all versions and variations of protocols which derive from the Bitcoin protocol.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for tasks and processes which are not limited to the realm of cryptocurrency. Such solutions would be able to harness the benefits of the blockchain (e.g. a permanent, tamper proof records of events, distributed processing etc) while being more versatile in their applications.

One such area of interest is the use of the blockchain for the storage, sharing, accessing and controlling of data among users. Today, this is achieved via the Internet, with servers hosting web sites and pages which users visit in order to access the desired data, typically with a search engine.

However, some observers have begun to envisage the use of the blockchain to address some of the disadvantages of the Internet, such as control of large amounts of data and content by centralised parties. See, for example, "Life After Google: The Fall of Big Data and the Rise of the Blockchain Economy", George Gilder, Gateway Editions, July 2018, ISBN-10: 9781621575764 and ISBN-13: 978-1621575764.

Thus, it is desirable to provide an arrangement enabling such data to be stored, processed, retrieved, searched and/or shared on the blockchain, advantageously utilising the distributed, unalterable and permanent nature of the blockchain. Such an improved solution has now been devised. Embodiments of the present disclosure provide, at least, alternative, efficient and secure techniques for implementing a blockchain solution and for storing, processing, searching and/or retrieving data thereon or therefrom. Embodiments also provide, at least, an alternative, blockchain-implemented technical infrastructure for storing, processing, retrieving, transferring, searching and/or sharing data between computing nodes. Because the invention enables the blockchain network to be used in a new way and for the provision of an improved and technical result, the invention provides an improved blockchain-implemented network.

Embodiments also provide solutions for the secure control of access to digital resources over a technically different and improved computing platform which comprises a blockchain and a blockchain protocol.

The invention is defined in the appended claims.

In accordance with the invention there may be provided a computer implemented method and corresponding system(s). The method may be described as a method for enabling or controlling the processing, storing, retrieving, identifying and/or sharing of data via a blockchain. Additionally or alternatively, it may be described as a method for associating or linking data stored within (separate/different) blockchain transactions to enable the identification, retrieval and/or sharing of said data.

The method may include the step of processing at least one blockchain transaction (Tx)
comprising a transaction ID (TxID), comprising:
  a protocol flag;
  a discretionary public key (DPK); and
  a discretionary transaction ID (DTxID).

This combination of features enables portions of data to be identified on a blockchain, and also to be linked/associated with one another when provided in a plurality of transactions. It enables a graph or tree-like structure to be constructed, which reflects the hierarchical relationships between portions of data, facilitating their processing, searching, access, generation and sharing. Herein, "sharing" may include providing to a node or user, sending, communicating, transmitting or providing access to the portion of data.

The transaction ID (TxID) is the identifier for the transaction as known in the art of blockchain protocols—each blockchain transaction has a unique ID as part of the underlying blockchain protocol. By contrast, the discretionary public key (DPK) and/or the discretionary transaction ID (DTxID) may be "discretionary" in that they are provided as part of the present invention rather than essential component(s) of the transaction as dictated by the protocol of the underlying blockchain. Put another way, they are not required in order for the transaction to be valid in accordance with the protocol of the underlying blockchain eg Bitcoin. Additionally or alternatively, they may be described as additional, non-essential items which are provided as part of the present invention, not because the blockchain protocol requires them.

Preferably, the protocol flag is associated with and/or indicative of a blockchain-based protocol for searching for, storing in and/or retrieving data in one or more blockchain transactions. The protocol flag may be an indicator or marker. It may indicate that the transaction is formed in accordance with a pre-determined protocol. This may be a protocol other than the protocol of the underlying blockchain. It may be a search protocol in accordance with any embodiment described herein (i.e. what may be referred to as the "metanet" protocol described herein).

The term "processing" may be interpreted as meaning any activity relating to the transaction or its associated data, including generating, transmitting, validating, accessing, searching for, sharing submitting to a blockchain network, and/or identifying.

The discretionary transaction ID may be an identifier, label, indicator or tag which is associated with the transaction (Tx) in accordance with an embodiment of the present invention. We use the term "indicator" to include all of these terms. It should be noted that, as known in the art and readily understood by the skilled addressee, each transaction on a blockchain is uniquely identified by an identifier, typically referred to in the art as the TxID. The TxID is an essential, required and non-discretionary part of the underlying blockchain protocol. This non-discretionary TxID is not to be confused with the discretionary transaction ID (DTxID) as referred to herein.

Preferably, the blockchain transaction (Tx) further comprises a portion of data, or a reference to a portion of data. The reference to the portion of data may be a pointer, address or other indicator of a location where the data is stored. The portion of data may be any type of data or digital content e.g. a computer-executable item, text, video, images, sound file etc. The portion of data may be referred to as "content". The portion of data or the reference to it may be in a processed form. For example, it may be a hash digest of the portion of data. The data may be stored on the blockchain or off it (i.e. "off chain").

Preferably, the portion of data or reference to a portion of data, the protocol flag, the discretionary public key (DPK) and/or the discretionary transaction ID (DTxID) are provided within an output (UTXO) of a blockchain transaction. One or more of them may be provided within a locking script associated with the output (UTXO).

Preferably, the portion of data, reference to the portion of data, the protocol flag, the discretionary public key (DPK) and/or the discretionary transaction ID (DTxID) are provided within the transaction (Tx) at a location following a script opcode for marking an output as invalid for subsequent use as an input to a subsequent transaction. This script opcode may be the OP_RETURN opcode in one or more variants of the Bitcoin protocol, or may be a functionally similar/equivalent opcode from another blockchain protocol.

Preferably, the transaction (Tx) further comprises one or more attributes. This enables a more detailed approach to searching for data/content. The attributes may also be referred to as "values", "labels" or "tags" or "identifiers". They may be used to describe or annotate the portion of data, or provide additional information relating to the portion of data.

Preferably, the one or more attributes comprises a keyword, tag or identifier associated with:
i) a/the portion of data provided within or referenced within the transaction (Tx); and/or
ii) the transaction (Tx).

Preferably, the transaction (Tx) further comprises an input including:
a parent public key (PPK) associated with a logical parent transaction (LPTx) that is identified by the discretionary transaction ID (DTxID); and
a signature generated using the parent public key (PPK).

This enables a logical hierarchy to be constructed between the transactions and their embedded data. Thus, a plurality of associated or logically linked transactions on the blockchain can be processed efficiently, securely and quickly. The logically associated transactions may not be stored on the blockchain at contiguous blockheights but they can be identified and/or accessed easily and securely.

Preferably, the method further comprises the step of using the discretionary public key (DPK) and the transaction ID (TxID) to identify the transaction (Tx) or the logical parent transaction within a blockchain.

Additionally or alternatively, the invention provides computer implemented method comprising the step of:
associating a public key with a blockchain transaction (Tx) which comprises a transaction ID; and
searching for the blockchain transaction (Tx) based on the transaction ID and the transaction public key.

Thus, the method may be an improved solution for storing, searching, identifying, communicating and/or accessing data via a blockchain. The method provides improvements for data communication and exchange across an electronic network, specifically a peer-to-peer blockchain network.

The public key and/or transaction ID may be discretionary as described above. Any feature(s) described above or herein may also be utilised in accordance with this embodiment of the invention but are not re-recited or reproduced here for the sake of brevity and clarity.

It may further comprise the step of accessing or otherwise processing a portion of data provided within or referenced from the transaction (Tx).

The transaction may comprise a transaction ID (TxID), a protocol flag; a discretionary public key (DPK); and a discretionary transaction ID (DTxID). The transaction (Tx) may further comprise a portion of data, or a reference to a portion of data. The portion of data or reference to a portion of data, the protocol flag, the discretionary public key (DPK) and/or the discretionary transaction ID (DTxID) may be provided within an output (UTXO), preferably within a locking script associated with the output (UTXO).

The portion of data, reference to the portion of data, the protocol flag, the discretionary public key (DPK) and/or the discretionary transaction ID (DTxID) may be provided within the transaction (Tx) at a location following a script opcode for marking an output as invalid for subsequent use as an input to a subsequent transaction.

The transaction (Tx) may comprise one or more attributes. The one or more attributes may comprise a keyword, tag or identifier associated with:
  i) a portion of data provided within or referenced within the transaction (Tx); and/or ii) the transaction (Tx).

The transaction (Tx) may further comprises an input including: a parent public key (PPK) associated with a logical parent transaction (LPTx), wherein the logical parent transaction (LPTx) is identified by the discretionary transaction ID (DTxID); and a signature generated using the parent public key (PPK).

The method may comprise: using the discretionary public key (DPK) and the transaction ID (TxID) to identify the transaction (Tx) or the logical parent transaction within a blockchain. This may be performed during a searching step.

The protocol flag may be associated with and/or indicative of a blockchain-based protocol for searching for, storing in and/or retrieving data in one or more blockchain transactions.

The invention also provides a corresponding system arranged and configured to perform the steps of any embodiment of the method(s) described herein. It may comprise a computer-implemented system comprising:
  a processor; and
  memory including executable instructions that, as a result of execution by the processor, causes the system to perform any embodiment of the computer-implemented method as described herein.

The invention also provides a non-transitory computer-readable storage medium having stored thereon executable instructions that, as a result of being executed by a processor of a computer system, cause the computer system to at least perform an embodiment of the method as described herein.

Some embodiments of the method/systems of the invention may comprise one or more features as described below, and in particular in the section entitled "naming and Addressing".

These and other aspects of the present invention will be apparent from and elucidated with reference to, the embodiment described herein. An embodiment of the present invention will now be described, by way of example only, and with reference to the accompanying drawings, in which:

FIG. 1 shows a blockchain transaction embodying the present invention in which data is stored in a plurality of outputs;

FIG. 2 shows a blockchain transaction embodying the present invention in which data is stored in an input;

FIG. 3 shows a series of blockchain transactions embodying the present invention in which data is stored over outputs of a plurality of blockchain transactions;

FIG. 4 shows a blockchain transaction embodying the present invention transferring cryptocurrency payment to allow access to data by means of an atomic swap;

FIG. 5 shows a blockchain transaction embodying the present invention for redeeming the payment of the transaction of FIG. 4;

FIG. 6 shows secret values kept by participants in a blockchain transaction embodying the present invention issuing tokens to allow access to data by means of an atomic swap;

FIGS. 7 and 8 show blockchain transactions embodying the present invention for issuing tokens to allow access to data by means of an atomic swap;

FIGS. 9 and 10 show blockchain transactions embodying the present invention for redeeming tokens issued by means of the transactions of FIGS. 7 and 8;

FIGS. 11 and 12 show blockchain transactions for accessing the secrets exchanged by the transactions of FIGS. 9 and 10;

FIG. 13 provides an illustration of the Metanet graph structure in accordance with an embodiment of the present invention.

Figure 14:
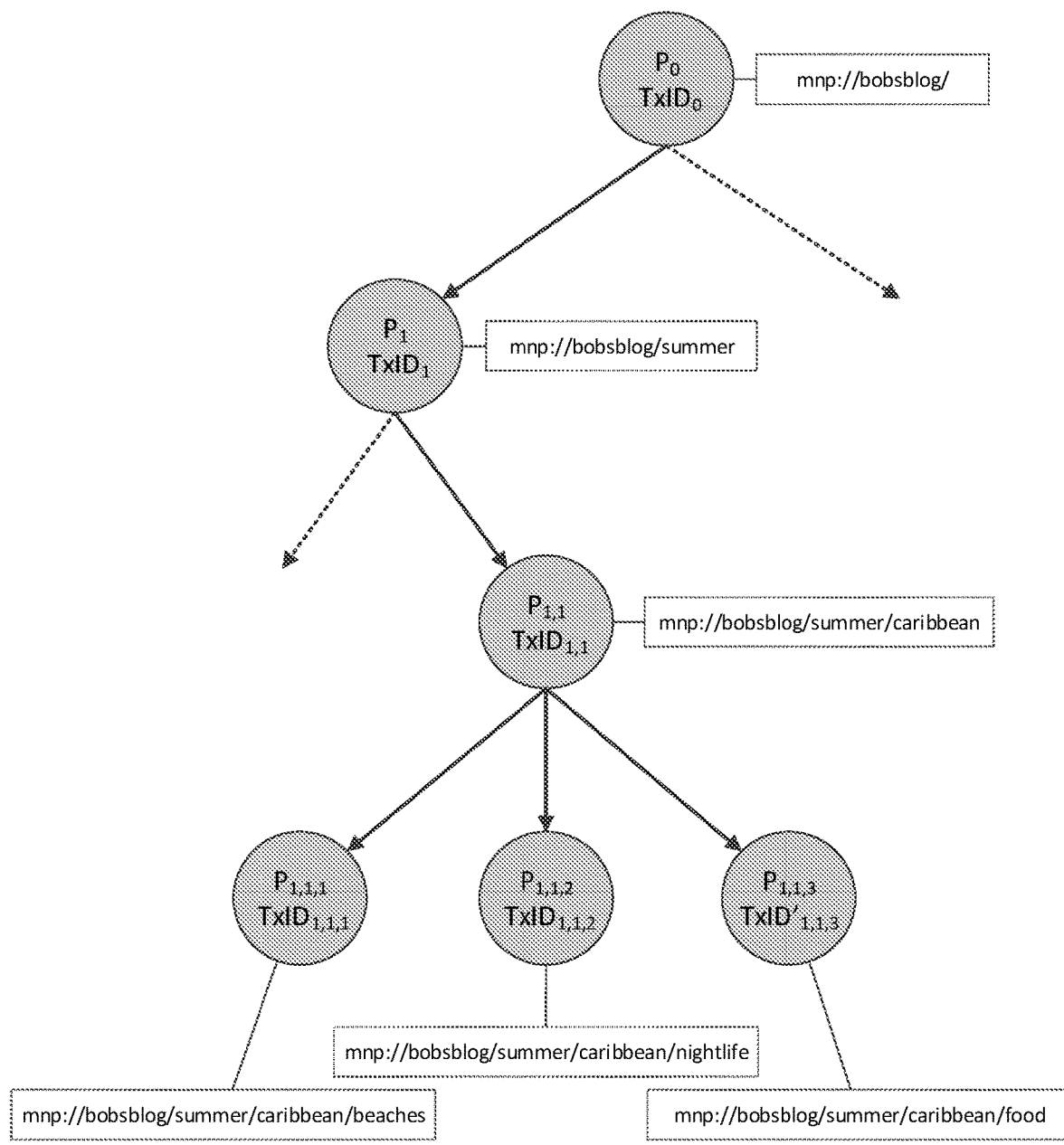

FIG. 14 shows an illustration of a Metanet graph tree for the domain 'bobsblog' including MURL search paths in accordance with an embodiment of the present invention.

Figure 15:
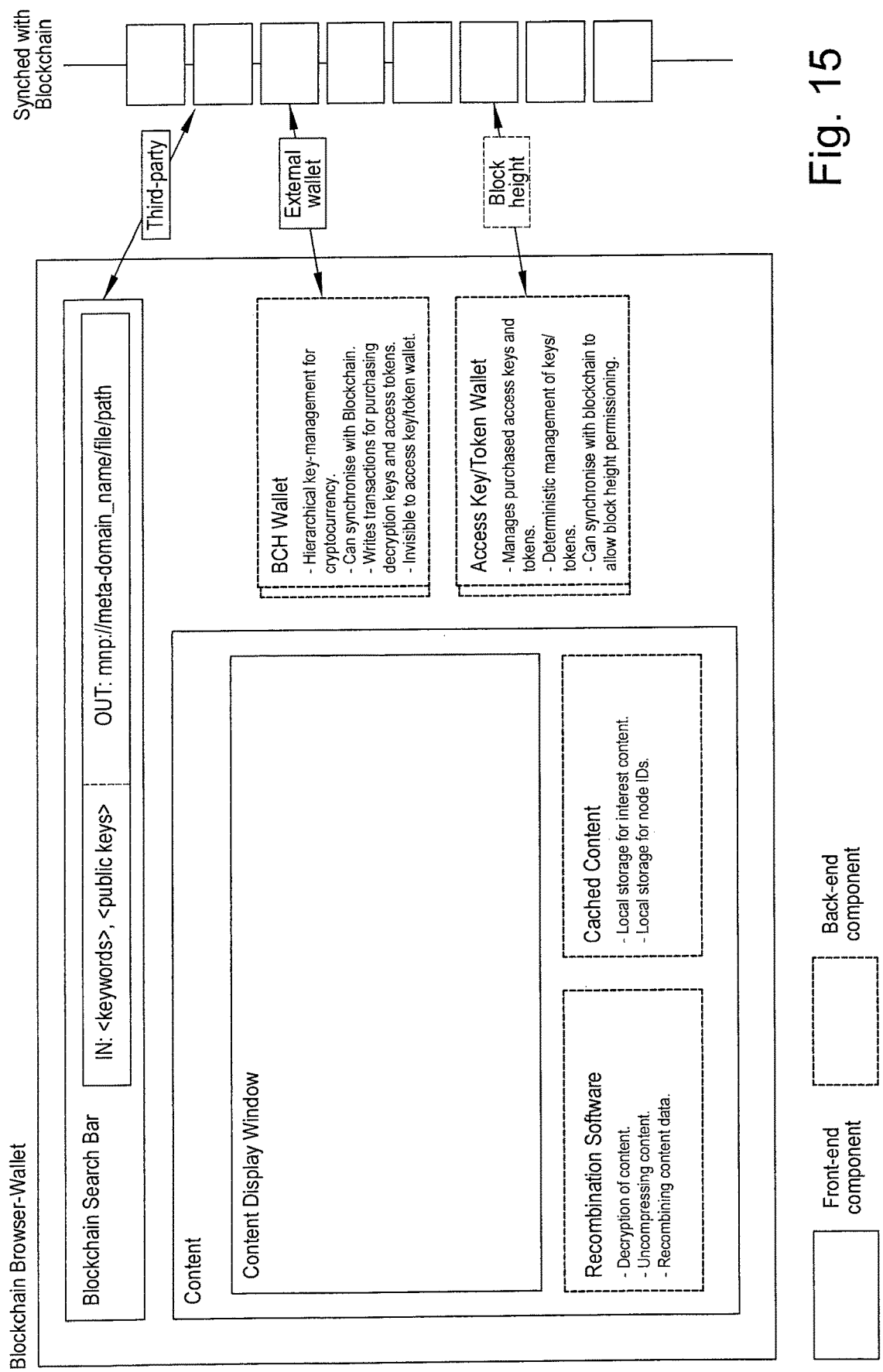

FIG. 15 shows a schematic for an illustrative embodiment of a browser-wallet in accordance with one example of the invention, and how its core functions can be split across different components of the application.

Figure 16:
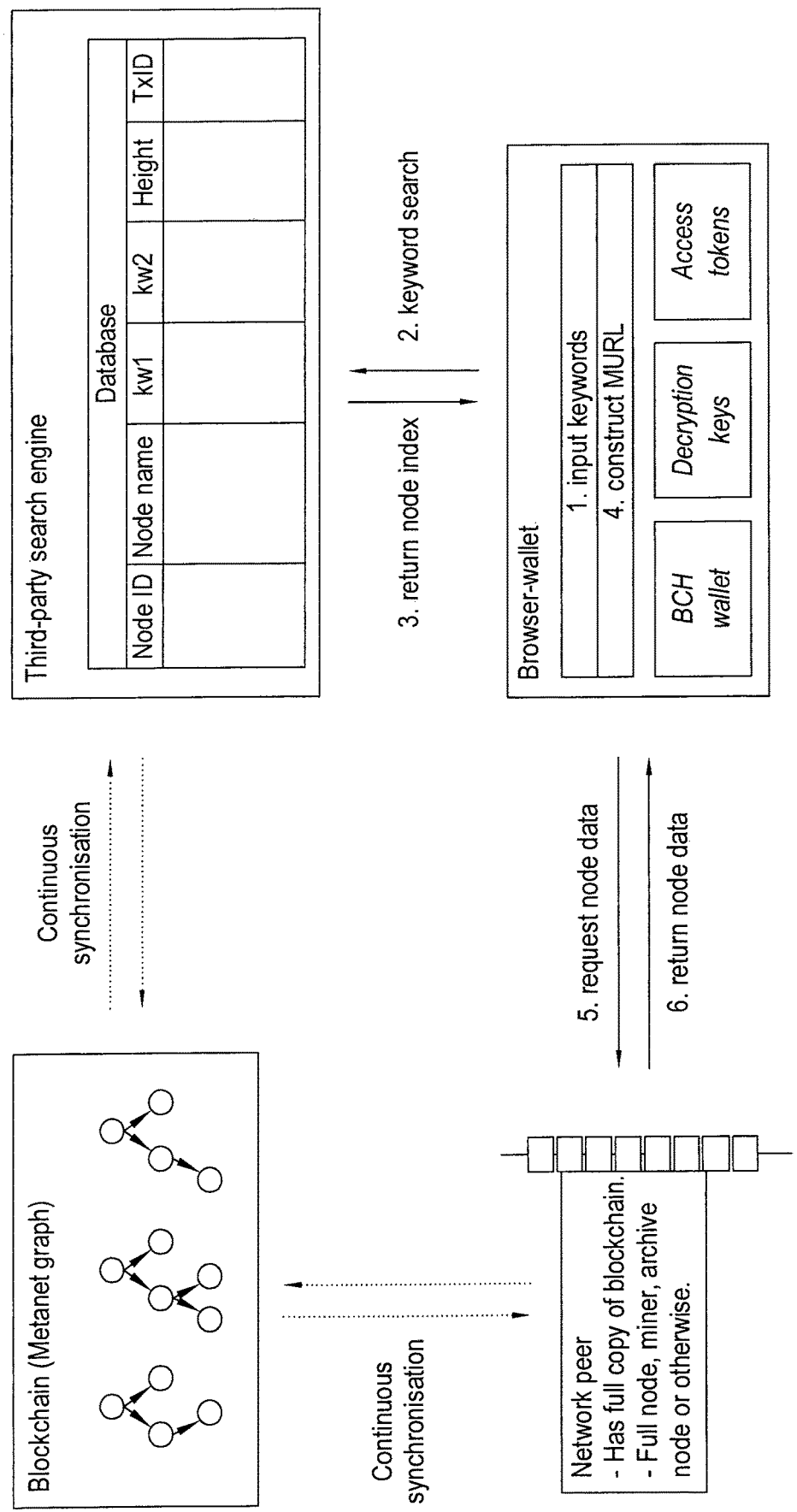

FIG. 16 provides a diagram illustrating how searching for content can be performed within the infrastructure of an embodiment of the invention.

Figure 17:
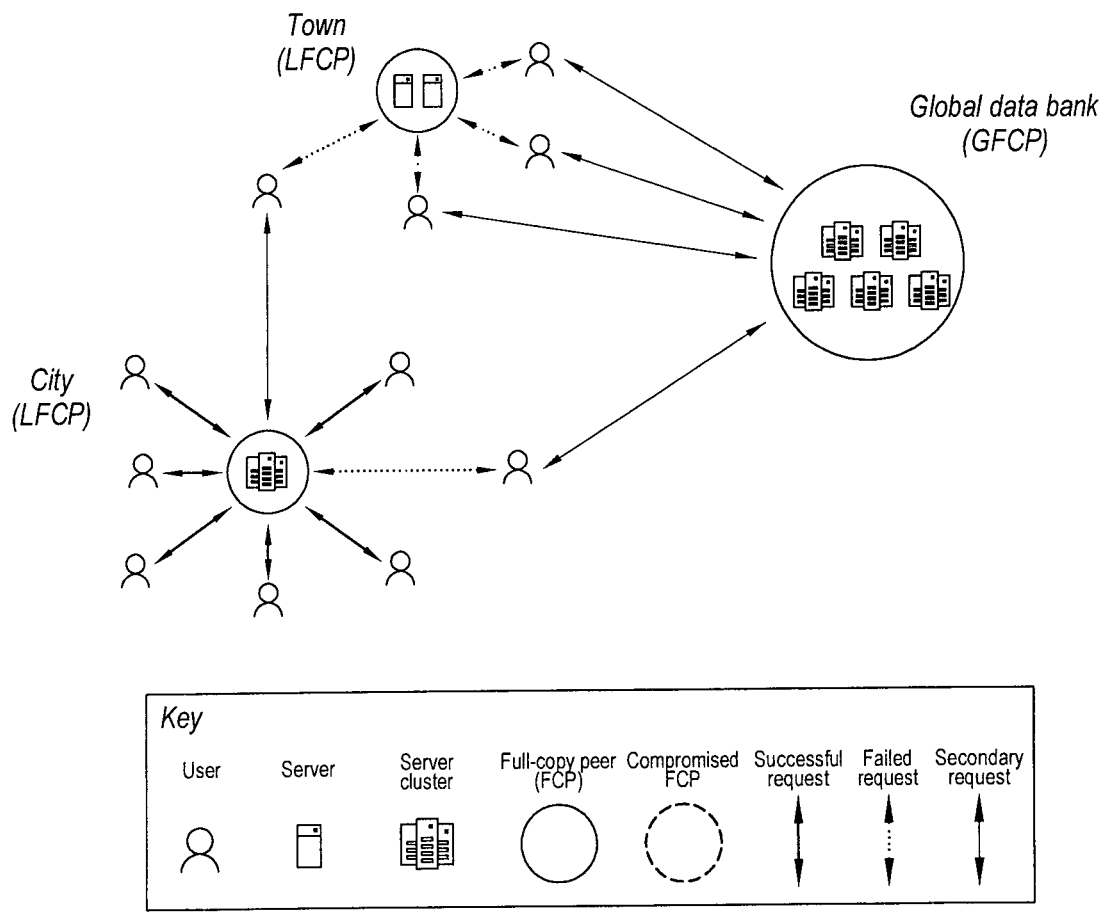

FIG. 17 shows an illustrative interaction between local- and global-full copy peers in accordance with an embodiment of the invention.

FIG. 18 shows a Metanet a tree (or graph) for use in reference to the illustrative use case described below.

Figure 19:
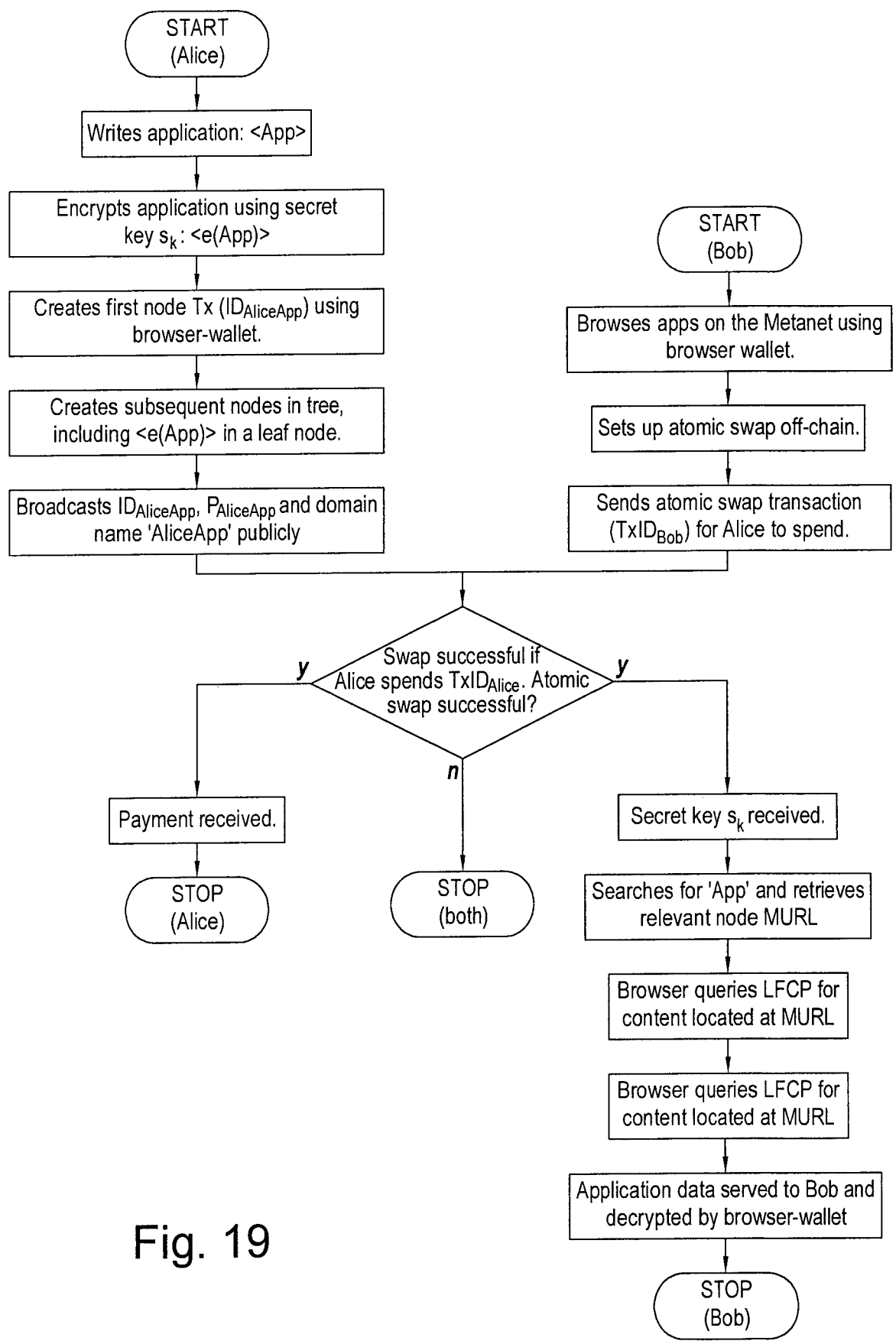

FIG. 19 shows a flow chart which illustrates the process embodied by the illustrative use case provided below.

Figure 20:
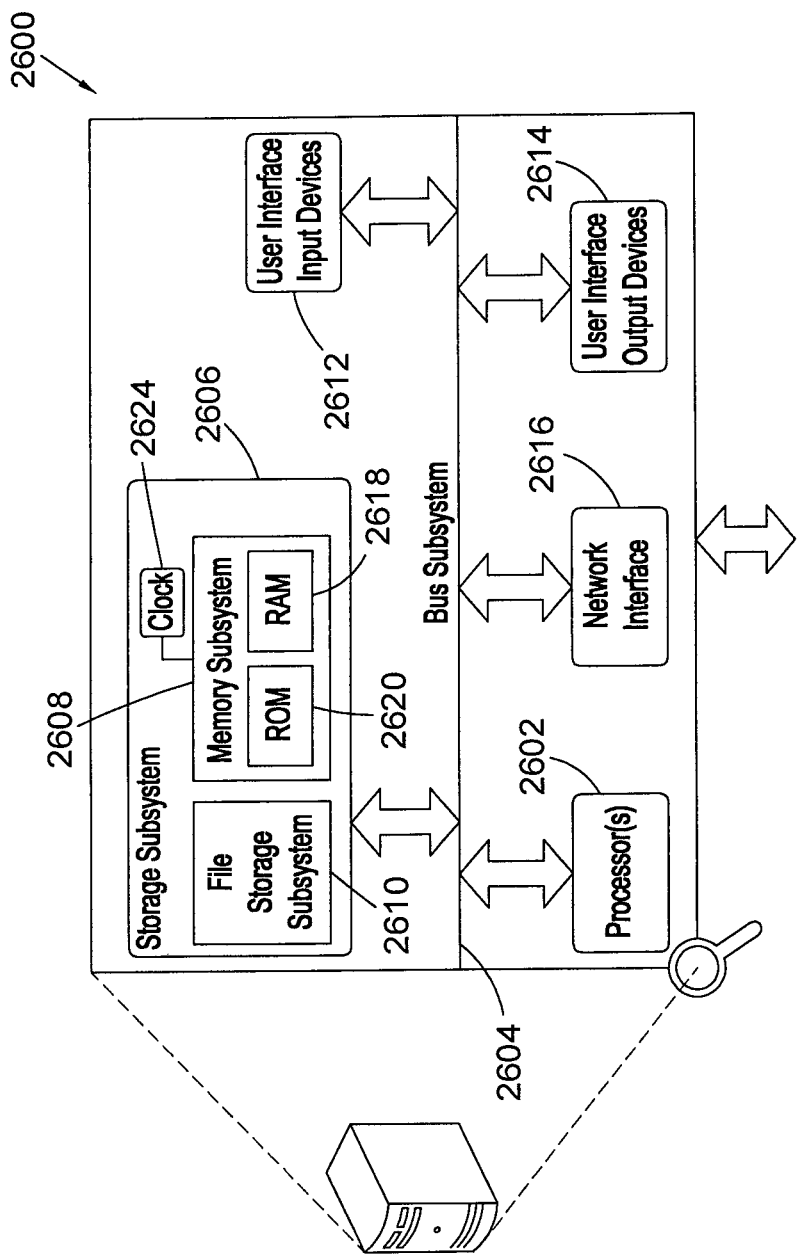

FIG. 20 is a schematic diagram illustrates a computing environment in which various embodiments can be implemented.

The term "bitcoin" is used herein for convenience only, and is intended to include all cryptocurrency/blockchain protocols including, but not limited to, all variations that are derived from the Bitcoin protocol as well as any alternative protocols for other blockchains. In the remainder of this document, the protocol determining operation of the embodiments of the present invention will be referred to as the "Metanet protocol".

The terms "content" "digital content" and "data" may be used interchangeably herein to refer to data that is stored in, referenced by or otherwise accessed via a blockchain transaction in accordance with embodiments of the present invention. The data is additional/discretionary data that is being conveyed, communicated or stored via the blockchain, as opposed to data that is required by the underlying blockchain protocol as part of the transaction code itself.

Overview

As stated above, there is a recognised need for an improved and/or alternative infrastructure for storing, writing, accessing and reviewing data between and by computing nodes. It would be advantageous to use the benefits which are inherent with blockchain technology (e.g. immutable records, cryptographically enforced control and access, built-in payment mechanism, ability to publicly inspect the ledger, distributed architecture etc). However, the construction of a "blockchain implemented internet" is challenging from a number of technical perspectives.

These challenges may include, but are not limited to: how to locate a particular portion of data within the network; how to secure and control access to the data so that only authorised parties may gain access; how to transfer the data from one party to another in a per-to-peer manner; how to arrange the data so that it can be logically associated yet stored in different locations within the network and how to subsequently combine it from different locations to provide a collective and augmented result; how to provide and/or store data in a hierarchical fashion; how to allow users and parties with different computing platforms access to the desired data; how to store, provide and share data across a (potentially global) computing network without reliance on or the need for large storage servers and centralised data controllers, and how to improve the efficiency of such data-related activities on the network.

The present invention provides such an improved solution in a manner which, in some ways, is analogous to the internet but achieves its results in an entirely different way, using an entirely different platform of hardware and software components from that known in the prior art. In accordance with embodiments of the present invention, the servers which store internet/web data and provide it to end users are replaced by blockchain transactions residing on the blockchain network. In order to achieve this, several innovations have had to be devised. These are described in the following sections.

Inserting Data into the Blockchain "Metanet"

Referring to FIG. 1, a blockchain transaction embodying the present invention is shown in which first data to be stored on the blockchain is stored in one or more first outputs of the transaction, and second data representing attributes of the first data is stored in one or more second outputs of the transaction. One or more first parts <Content 1> of the first data are stored in a spendable output of the transaction. Data <Attribute 1> and <Attribute 2>, representing respective attributes of the first data, together with a flag indicating that data is being stored according to the Metanet protocol, is stored in a second, unspendable output of the transaction. The term "unspendable" is used to indicate that at least one first and/or second output of the transaction may include a script opcode (OP RETURN) for marking an output as invalid for subsequent use as an input to a subsequent transaction.

It is advantageous to store the content and attributes parts of the data separately in separate outputs (UTXOs) of the transaction.

FIG. 2 shows a blockchain transaction embodying the present invention in which first data <Content 1> to be stored on the blockchain is stored in an input of the transaction. The Metanet flag, and the attributes data <Attribute 1> and <Attribute 2> are stored in an unspendable output of the transaction, in a manner similar to the arrangement shown in FIG. 1.

Data Insertion

Data Insertion Methods

It is desired to be able to insert the following data into the blockchain
a) Metanet Flag
b) Attributes
c) Content The content is data to be stored on the blockchain, the Metanet Flag is a 4-byte prefix that acts as the identifier for any data pertaining to the Metanet protocol, while the attributes contain indexing, permissioning and encoding information about the content. This could include, but is not limited to, data type, encryption and/or compression schemes. Such attributes are also often referred to as metadata. Use of this term in the present document will be avoided in order to avoid confusion with transaction metadata.

The following techniques can be used to embed this data within a Bitcoin script:
1. OP_RETURN—In this method all data (attributes and content) are placed after OP_RETURN in the locking script of a provably unspendable transaction output.
An example of an output script using this operator is:
UTXO0: OP_RETURN <Metanet Flag> <attributes> <content>
2. OP_RETURN with OP_DROP—In this case the OP_RETURN contains the attributes, whilst the content is stored before an OP_DROP in a spendable transaction script (either locking or unlocking). The content can be split into multiple data packets within the transaction input and outputs. However, it is advantageous to insert data into transaction outputs as it is only output scripts that may be signed in the Bitcoin protocol. If the data is inserted into the transaction input, OP_MOD can be used as a checksum on the data to ensure its validity in place of miner validation. For example, one could perform a 32-bit OP_MOD operation and check that it is equal to a pre-calculated value.

In this case, the attributes may contain information about how the content data packets are recombined. In addition, providing the hash of the recombined data packets H(content1+content2) as an attribute enables verification that the recommended recombination scheme has been used.

A transaction that implements the second data insertion method is shown in FIG. 1. For simplicity this transaction only includes content inserted in its outputs, that is signed by its single input. Content inserted into additional inputs would also be possible using OP_DROP statements using this method as shown in FIG. 2.

If the content is very large it may be advantageous to split it over multiple transactions.

Such an arrangement is shown in FIG. 3. FIG. 3 shows a pair of blockchain transactions embodying the present invention in which first data <Content> to be stored on the blockchain is split into two chunks <Content chunk 1> and <Content chunk 2> which can subsequently be recombined as <Content>=<Content chunk 1>||<Content chunk 2>, where the operator '||' concatenates the two chunks of content data. This concatenation operator may be replaced by any desired bitwise or similar piecewise binary operator. The two chunks <Content chunk 1> and <Content chunk 2> are then stored in respective spendable outputs of the separate blockchain transactions, while data relating to the attributes of the content data is stored in respective unspendable outputs of the blockchain transactions. Again, the attributes can contain information about the recombination scheme. For example, the content may be raw data, an executable program or a HTML webpage. Additionally, content1 may include a pointer to the location on the blockchain of content2, which functions in the same way as an embedded HTML link within a webpage.

It should be noted that both transactions take the same public key P (and ECDSA signature) as input, such that <Content chunk 1> and <Content chunk 2> can be related by the same public key P despite being stored in different transactions with TxID1 and TxID2 respectively.

Exploiting the Role of Miner Validation

Here the transaction validation process performed by miners is used to gain an advantage when storing this data. This is because all data in transaction outputs will be signed by the owner of a public key P in at least one transaction input (if the SIGHASH|ALL flag is present) and this signature will be checked in the transaction validation process that all miners perform.
This Ensures
  Data integrity—If the data is corrupted the CHECKSIG operation will fail.
  Data authenticity—The owner of P has provably witnessed and signed the data.
This is particularly advantageous for content that is split over multiple transactions as the input signature of P provides a provable link between the split components of the data, as described above with reference to the arrangement is shown in FIG. 3.

Rabin Signature

Another way to ensure data authenticity is to use Rabin signatures, which can be used to sign the data itself rather than the whole message. This can be advantageous as the signer does not need to sign every individual transaction in which the data appears, and the signature can be re-used in multiple transactions.

Rabin signatures can be easily validated in script. These can be incorporated in case (2) above by inserting Rabin signature validation before the OP_DROP command, i.e.
  <content1> <Rabin Sig (content1)> FUNC_CHECK-RABSIG OP_DROP <H($P_1$)> [CheckSig $P_1$]
It should be noted that this cannot be done in case (1) above since a script containing OP_RETURN fails anyway and so no validation can be achieved.

Specific Example of Use of Rabin Signature

Introduction

Digital signatures are a fundamental part of the Bitcoin protocol. They ensure that any Bitcoin transaction recorded on the blockchain has been authorised by the legitimate holder of the Bitcoin being sent. In a standard Bitcoin P2PKH transaction a transaction message is signed using the elliptic curve digital signature algorithm (ECDSA). However the ECDSA signature is generally applied to the whole transaction.

There are some use cases of the Bitcoin blockchain where a participant from outside the network may want to provide a signature for arbitrary data types which can then be used by network participants. By using Rabin digital signatures any piece of data can be signed—even if it originates from outside the Bitcoin blockchain and then placed in one or multiple transactions.

It will now be shown how data can be signed and verified directly in Bitcoin script by utilising the algebraic structures of the Rabin cryptosystem
Rabin Digital Signatures
  The Rabin Digital Signature Algorithm
Background Mathematics
  Definition—Integers mod p
  The integers modulo p are defined as the set $\mathbb{Z}_p := \{1, 2, \ldots, p-1\}$ Fermat's Little Theorem
  Let p be a prime number. Then for any integer a the following applies $a^{p-1} \equiv 1 \bmod p$ Euler's Criterion
  Let p be a prime number. r is a quadratic residue mod p if and only if $r^{\frac{p-1}{2}} \equiv 1 \bmod p$ Modular Square Roots (p=3 mod 4)
  Let p be a prime number such that p≡3 mod 4. Then for any integer r satisfying Euler's criterion, if a is an integer such that $a^2 \equiv r \bmod p$ Then there exists a solution for a of the form $a \equiv \pm r^{\frac{p+1}{4}} \bmod p$ Chinese Remainder Theorem
  Given pairwise coprime positive integers $n_1, n_2, \ldots, n_k$ and arbitrary integers $a_1, a_2, \ldots, a_k$, the system of simultaneous congruences $x \equiv a_1 \bmod n_1$ $x \equiv a_1 \bmod n_2$ $\vdots$ $x \equiv a_k \bmod n_k$ has a unique solution modulo $N = n_1 n_2 \ldots n_k$. As a special case of the Chinese Remainder Theorem, it can be shown that $x \equiv r \bmod n_1$ and $x \equiv r \bmod n_2$ if and only if $x \equiv r \bmod n_1 \cdot n_2$ The Rabin Digital signature Algorithm
  The Rabin digital signature algorithm can be described as follows:
  For any message m let H be a collision resistant hashing algorithm with k output bits.
  To generate the keys, choose prime numbers p and q, each with bit-length approximately k/2 such that p≡3 mod 4, q≡3 mod 4 and compute the product n=p·q. The private keys are (p, q) and the public key is n=p·q.
  To sign the message, m, the signer chooses a padding U such that H(m|U) satisfies $H(m\|U)^{\frac{p-1}{2}} \equiv 1 \bmod p$ $H(m\|U)^{\frac{q-1}{2}} \equiv 1 \bmod q$ The signature, S, is computed using the formula $S \equiv \left[\left(p^{q-2} \cdot H(m\|U)^{\frac{q+1}{4}} \bmod q\right) \cdot p + \left(q^{p-2} \cdot H(m\|U)^{\frac{p+1}{4}} \bmod p\right) \cdot q\right] \bmod n.$ The signature for the message m is the pair (S, U). Verification can be simply done by checking that, for a given m, U and S $$H(m|U) \equiv S^2 \bmod n \quad \text{(Equation 1)}.$$

This is true if and only if there exists an integer λ in the range 0, . . . , n−1 such that $$H(m|U) + \lambda \cdot n = S^2 \quad \text{(Equation 2)}.$$

The factor λ may be safely included in the signature, to provide the combination (S, λ, U). The advantageous features of the Rabin signature scheme are as follows:
  a) Signature generation is computationally expensive, whereas verification of the signature is computationally easy.
  b) The security of the signature relies only on the hardness of integer factorisation. As a result, Rabin signatures are existentially unforgeable (unlike RSA).
  c) The hash function values H(m|U) must be of a similar magnitude to the public key n.

Verification in script is straightforward as it only requires squaring a given signature, performing a modular reduction and then checking that the result is equal to H (m|U).

Rabin Signature Proof

Let p, q be coprime and n=p·q. By the Chinese Remainder Theorem it can be shown that $$S^2 \equiv H(m|U) \bmod n$$

If and only if $$S^2 \equiv H(m|U) \bmod p$$

$$S^2 \equiv H(m|U) \bmod q$$

It can be shown that $$S^2 \equiv H(m|U) \bmod q$$

Using $$S \equiv \left(\left(p^{q-2} H(m\|U)^{\frac{q+1}{4}} \bmod q\right) \cdot p + \left(q^{p-2} H(m\|U)^{\frac{p+1}{4}} \bmod p\right) \cdot q\right) \bmod q$$

$$\equiv \left(\left(p^{q-2} H(m\|U)^{\frac{q+1}{4}} \bmod q\right) p\right) \bmod q$$

$$\equiv p^{q-2} H(m\|U)^{\frac{q+1}{4}} \cdot p \bmod q$$

$$\equiv (p^{q-1} \bmod q) H(m\|U)^{\frac{q+1}{4}} \bmod q$$

$$\equiv H(m\|U)^{\frac{q+1}{4}} \bmod q$$

Therefore $$S^2 \equiv H(m\|U)^{\frac{q+1}{2}} \equiv$$

$$H(m\|U)^{\frac{2}{q-1}} \cdot H(m\|U) \equiv H(m\|U) \bmod q$$

Where it has been assumed that H(m|U) satisfies Euler's criterion. By a similar calculation one can also show that $$S^2 \equiv H(m|U) \bmod p$$

Rabin Signatures in Bitcoin

Signature Verification in Script

A small number of arithmetic and stack manipulation opcodes are required to verify a Rabin signature. Consider a redeem script of the form OP_DUP OP_HASH160 <$H_{160}$(n)> OP_EQUALVERIFY OP_MUL OP_SWAP OP_2 OP_ROLL OP_CAT FUNC_HASH3072 OP_ADD OP_SWAP OP_DUP OP_MUL OP_EQUAL where n is the public key of the signer. This will evaluate to TRUE if and only if is provided with the input <S> <U> <m> <λ> <n> where m is an arbitrary message, and (S, λ, U) is a valid Rabin signature. Alternatively, if the Rabin signature is checked using equation 1 above the redeem script is given by OP_DUP OP_HASH160 <$H_{160}$(n)> OP_DUP OP_TOALTSTACK OP_SWAP <roll index> OP_ROLL OP_CAT FUNC_HASH3072 OP_SWAP OP_MOD OP_SWAP OP_DUP OP_MUL OP_FROMALTSTACK OP_MOD OP_EQUAL In this case the script will evaluate to TRUE if and only if is provided with the input <S> <U> <m> <n>

In both redeem scripts, use has been made of the 3072-bit hash projection function 'FUNC_HASH3072'. For a given message/padding concatenation the FUNC_HASH3072 hash projection is generated using the script OP_SHA256 {OP_2 OP_SPLIT OP_SWAP OP_SHA256 OP_SWAP} (x11)
OP_SHA256 OP_SWAP OP_SHA256 {OP_CAT}(x11)

Compression of Data

Internet data consists of JavaScript and common file types such as text files (SML, HTML, etc.), video files (MPEG, M-JPEG etc.), image files (GIF, JPEG etc.) and audio files (AU, WAV, etc.), for example as described in greater detail at https://www.doc.ic.ac.uk/~nd/surprise_97/journal/vol1/mmp/#text. Using the above data insertion techniques, these different data types can also be embedded on the blockchain. Larger file sizes can be compressed using one of several existing coding schemes before embedding it on the blockchain. Lossless data compression algorithms such as Run-length and Huffman encoding can be used in several applications, including ZIP files, executable programs, text documents and source code.

Many different algorithms exist depending on the specific input data. Apple Lossless and Adaptive Transform Acoustic Coding can be used to compress audio files, PNG and TIFF for the compression of Graphics files, while movie files can be compressed using one of many lossless video codecs. Any compression of the data content can be indicated using a flag within the attributes. For example, the flag for the LZW lossless coding scheme in the attributes would be <LZW>.

Encryption and Paid Decryption

Encryption of Data

The owner of the content may choose to protect the content before embedding it on the Blockchain. This ensures that the content cannot be viewed without acquiring the necessary permissions.

There are many well-established techniques for the encryption of data (either plaintext or other data types). These can be categorised as asymmetric encryption or symmetric encryption.

Elliptic Curve Cryptography (ECC) is asymmetric as it relies on a public-private key pair. It is one of the most secure cryptosystems and is typically used in cryptocurrencies such as bitcoin. For ECC cryptography the Koblitz algorithm can be used to encrypt data.

In symmetric schemes a single key is used to both encrypt and decrypt the data. The Advanced Encryption Standard (AES) algorithm is considered one of the most secure symmetric algorithms that is seeded by such a secret, for example as described in greater detail in C. Paar and J. Pelzl, Chapter 4 in "Understanding Cryptography," Springer-Verlag Berlin Heidelberg $2^{nd}$ Ed., 2010, pp. 87-118.

When encrypting data stored on a blockchain there are advantages in using the same cryptosystems as the underlying blockchain. In bitcoin this is the secp256k1 conventions for ECC key pairs in asymmetric cryptography, and the SHA-256 hash function in symmetric cryptography. These advantages are:

- The security level of the encryption is the same as the underlying system in which the data is stored on.
- The software architecture needed for storing encrypted data will have a smaller codebase.
- The management of keys in a wallet can be used both for transactions and encryption/decryption.
- It is more efficient as the same keys can be used both for encryption and payment in the cryptocurrency, so fewer keys are required. This also reduces storage space.
- Fewer communication channels may be needed to exchange/purchase the ability to decrypt data.
- There is increased security as keys used for encryption and transactions are the same data structure and so targeted attacks for a specific type of key are mitigated.
- Keys can be purchased using the underlying cryptocurrency.

For illustrative purposes, how the Koblitz algorithm can be used to encrypt data using ECC is described.

Koblitz Algorithm

Given a ECC key pair $P_1=S_1 \cdot G$ the Koblitz algorithm allows anyone to encrypt a message using the public key $P_1$ such that only someone who knows the corresponding private key $S_1$ may decrypt the message.

Suppose it is desired to encrypt the plaintext message 'hello world' using the Koblitz method. This is done character-by-character. The first character 'h' is encrypted and decrypted as follows.

1. The character 'h' is mapped to a point on the secp256k1 curve. This is achieved by using the ASCII conventions to map a plaintext character to an 8-bit number. A point on the curve is then calculated by multiplying the base point G by this number. In the present example 'h' is mapped to 104 in ASCII, and the elliptic curve point is given by $P_m=104 \cdot G$.
2. The point $P_m$ is then encrypted using the public key $P_1$. This is achieved by choosing a random ephemeral key $k_0$ and calculating the pair of points $C_m=\{k_0 \cdot G, Q\}$ where $Q:=P_m+k_0 \cdot P_1$, which may then be broadcast.
3. The owner of the private key $S_1$ may decrypt the original point by calculating $P_m=Q-S_1 \cdot k_0 \cdot G$. They may then recover the original ASCII number by trial-and-error or by means of a look up table to establish which number x corresponds to $P_m=x \cdot G$.

Using the Blockchain to Purchase Permissions

Storing data on a blockchain has the obvious advantage that a payment mechanism is built into the system. Payments can be used to purchase

- Decryption data in order to view/use
- Permission to insert data at a particular address In both cases the buyer is using a cryptocurrency, for example Bitcoin, to purchase a secret that grants them permission to do something. This secret may be either a hash preimage or a private key.

An efficient and secure way to make such a purchase is to use an atomic swap. This keeps secure communication channels to a minimum and ensures that either the seller gets paid and the secret is revealed to the buyer, or neither event occurs.

Besides payments in cryptocurrencies, it can also be convenient to purchase a permission using an access token. This is a secret value (typically a hash preimage) that the buyer owns that they can use in order to make a purchase. Such tokens may be bought in bulk by the buyer ahead of time, and then activated at the time they would actually like to use the permission.

How atomic swaps are executed will now be described with reference to FIGS. 4 and 5.

Atomic Swaps Using Hash Puzzles or Private Key Puzzles

Suppose Alice is the owner of the secret. This secret may be either a hash preimage of a known hash digest, or the private key of a known public key. Suppose Bob wishes to use Bitcoin to buy this secret from Alice. A mechanism known as an atomic swap is described that enables this transaction to occur. It is atomic in the sense that either Alice gets paid Bitcoin and the secret is revealed to Bob, or neither event occurs.

The method is as follows:

Alice owns a private key $S_A$ of a public/private key pair $P_A=S_A \cdot G$ and Bob owns a private key $S_B$ of a public/private key pair $P_B=S_B \cdot G$.

Alice owns a secret which is either the preimage X of a known hash digest H(X), or the private key $S_1$ of a known public key $P_1=S_1 \cdot G$.

They agree on a price in Bitcoin for Alice to sell the secret to Bob.

Prior to these, Bob must set up a transaction to send Alice the ephemeral key $k_0$ off-block so that she can calculate $r_0$, a component of a digital signature.

Referring now to FIG. 4,

1. Bob transfers Bitcoin to Alice that are locked with the following redeem script
   R (written schematically):
   For a hash preimage:
   R=[Hash Puzzle H(X)] [CheckSig $P_A$]
   This forces the preimage X to be exposed in the input of the redeem script.
   For a private key:
   R=[Private Key Puzzle $P_1$, $r_0$] [CheckSig $P_A$]
   This forces the private key $S_1$ to be able to be calculated from the input to the redeem script. In this case Bob and Alice must agree on an ephemeral key $k_0$ that is used to construct $r_0$, where $(r_0, R_y)=k_0 \cdot G$.
2. Since Alice knows her secret (either X or $S_1$) she can spend her funds on the Bitcoin blockchain by means of the transaction shown in FIG. 5. This allows Bob to determine her secret.

As an optional security feature, Alice and Bob may use their public keys $P_A$, $P_B$ to establish a shared secret S known only to both parties. This could be achieved in a manner outlined in International Patent Publication no. WO 2017/145016. In this case S may be added to the preimage X in the hash puzzle in order for X not to be revealed publicly on the blockchain. Similarly, in the private key puzzle S may be used as the ephemeral key $k_0$ to ensure that only Alice or Bob is able to calculate the private key.

A time-locked refund can be introduced to the procedure to prevent Bob's funds being locked by Alice, should Alice decide not to spend her funds.

Purchase Using Tokens

Suppose that the same situation exists as described above, but instead paying in cryptocurrency for Alice's secret at its point of use Bob would like to redeem an access token—that he has bought ahead of time—in exchange for the secret.

The procedure that Alice and Bob must follow is similar to the case described in the previous section, but instead uses a sequence of similar atomic swaps. There are two phases of the process; token issuance and token redemption.

Phase 1: Token Issuance

The token issuance phase is effectively a one-time purchase of tokens by Bob. For example, we will consider the scenario where Alice has 10 distinct secrets $X_1, X_2, \ldots, X_{10}$ and Bob wishes to make a single purchase for 10 tokens $T_1, T_2, \ldots, T_{10}$ which each grant him access to a respective secret.

First Bob generates a set of 10 tokens from a secret seed value Y known only to him. These tokens are created by sequential hashing of the seed to form a hash chain, where each token is calculated as $T_i = H^{10-i}(Y)$ for $i \in \{1,2,\ldots,10\}$.

Alice and Bob now have 10 secret values each, which can be revealed in hash puzzles for example, for the redemption of tokens. In order to issue these tokens however, they must also generate a secret initialising value $I_{Alice}$ and $I_{Bob}$ respectively. These are given as $I_{Alice} = k$, $k \in \mathbb{Z}_{256}$, $I_{Bob} = H^{10}(Y)$.

It should be noted that Alice's initialiser is simply a random integer with no specific meaning, but Bob's initialiser should be the hash of his first token $T_1 = H^9(Y)$. Extending the chain of tokens to the initialiser in this way allows the token issuance to also define the token to be used later for successive redemptions. In total the secret values kept by each participant are shown in FIG. 6.

Now Alice and Bob can agree to a price of 10 cryptocurrency units for the purchase of 10 tokens. The purchase of these tokens can happen in a number of ways, this is illustrated here using an atomic swap. The atomic swap is initiated by Alice and Bob broadcasting the transactions shown in FIGS. 7 and 8 respectively, in both of which the outputs require the solution to two hash puzzles and a valid signature.

Once both transactions appear in the blockchain Alice and Bob can share their share initialiser values $I_{Alice}$ and $I_{Bob}$ and complete the atomic swap for token issuance. As a result of this atomic swap Alice receives payment for the purchase of 10 tokens and both initialiser secrets are revealed. It should be noted that only Bob's secret $I_{Bob} = H^{10}(Y)$ is meaningful here because it will define the first hash puzzle to be solved [Hash Puzzle ($T_1$)], whose solution is the preimage $H^9(Y)$ of the initialiser $H^{10}(Y)$.

Phase 2: Token Redemption

At some point in the future Bob wants to redeem his first token $T_1 = H^9(Y)$ and receive his first secret $X_1$, but it will be recalled that he has already paid for this secret by purchasing a valid token. The process of redeeming a token will take the form of another atomic swap, where the solutions to the locking hash puzzles are a token $T_i$ and corresponding secret $X_i$.

To redeem his token, Bob should broadcast the transaction shown in FIG. 9, whose output is locked with the two hash puzzles. When Alice sees this transaction she broadcasts her own similar transaction as shown in FIG. 10, whose output is locked with the same two hash puzzles. The two participants can now exchange their secrets $T_1$ and $X_1$ and unlock the outputs to these transactions. Both parties can now redeem the nominal fee x by providing the correct unlocking script that also exposes both secrets. The transactions with these unlocking scripts are shown in FIGS. 11 and 12.

The completion of this atomic swap for redeeming a token reveals Alice's first secret $X_1$ to Bob, reveals Bob's first token $T_1$ to Alice and has a net-zero exchange of cryptocurrency funds, given that the amount x is suitably large to encourage both parties to spend the locked outputs. Crucially, this also establishes that the next token Bob can use must be the solution $T_2$ to the hash puzzle [Hash Puzzle $H(T_2)$], where the target hash $H(T_2) = T_1$ has just been revealed to Alice. This process can be repeated recursively until Bob has used his final token $T_{10} = Y$.

Naming and Addressing

Node and Edge Structure

It has been explained above how data can be inserted into the blockchain by providing it within transactions. We now present a protocol for structuring these transactions in logical way that allows for addressing of nodes, permissions, and content version control. The structure of this distributed peer metanet is analogous to the existing internet.

It should be noted that this is a "tier-2" protocol that does not modify the protocol or consensus rules of the underlying blockchain.

The aim of the structure described here is to
(i) Associate related content in different transactions to enable searching, identification and access to the data
(ii) Allow identification of content using human-readable keyword searches, to improve speed, accuracy and efficiency of searching
(iii) Build and emulate server-like structures within a blockchain Our approach is to structure data associated with the Metanet as a directed graph. The nodes and edges of this graph correspond to:

Node—A transaction associated with the Metanet protocol. A node stores content. (The terms "content" and "data" may be used interchangeably within this document).

A node is created by including an OP_RETURN that is immediately followed by <Metanet Flag>. Each node is assigned a public key $P_{node}$. The combination of public key and transaction ID uniquely specify the index of the node $ID_{node} := H(P_{node} \| TxID_{node})$.

The hash function used should be consistent with the underlying blockchain protocol that the invention is to be used with e.g. SHA-256 or RIPEMD-160 for Bitcoin.

Edge—An association of a child node with a parent node.

An edge is created when a signature Sig $P_{parent}$ appears in the input of a Metanet transaction, and therefore only a parent can give permission to create an edge. All nodes may have at most one parent, and a parent node may have an arbitrary number of children. In the language of graph theory the indegree of each node is at most 1, and the outdegree of each node is arbitrary.

It should be noted that an edge is an aspect of the Metanet protocol and is not itself a transaction associated with the underlying blockchain.

A valid Metanet node (with parent) is given by a transaction of the following form:

| TxID$_{node}$ | |
| --- | --- |
| Input | Output |
| <Sig P$_{parent}$> <P$_{parent}$> | OP_RETURN <Metanet Flag> <P$_{node}$> <TxID$_{parent}$> |

This transaction contains all the information needed to specify the index of the node and its parent $$ID_{node}=H(P_{node}\|TxID_{node}), \quad ID_{parent}=H(P_{parent}\|TxID_{parent}).$$

Moreover, since the signature of the parent node is required, only a parent can create an edge to a child. If the <TxID$_{parent}$> field is not present, or it does not point to a valid Metanet transaction, then the node is an orphan. It has no higher-level node by which it can be reached.

Additional attributes may be added to each node. These may include flags, names and keywords. These are discussed later in this document.

As shown, the index of a node (transaction) can be broken down into
a) Public Key $P_{node}$, which we interpret as the address of the node
b) Transaction ID TxID$_{node}$, which we interpret as the version of the node Two advantageous features arise from this structuring:
1. Version control—If there are two nodes with the same public key, then we interpret the node with transaction ID with greatest proof of work as the latest version of that node. If the nodes are in different blocks, then this can be checked with the block height. For transactions in the same block, this is determined by the Topological Transaction Ordering Rule (TTOR).
2. Permissioning—A child of a node can only be created if the owner of the public key $P_{node}$ signs the transaction input in the creation of a child node. Therefore $P_{node}$ not only represents the address of a node but also the permission to create a child node. This is intentionally analogous to a standard bitcoin transaction—a public key in not only an address but also the permission associated with that address.

Note that since the signature of the parent node appears in a UXTO unlocking script it is validated through the standard miner validation process at the point when the transaction is accepted to the network. This means that the permission to create a child node is validated by the bitcoin network itself.

It is worth noting that standard Internet Protocol (IP) addresses are unique only within a network at a certain point in time. On the other hand, the index of a node in the Metanet is unique for all time and there is no notion of separate networks, which allows data to be permanently anchored to a single object ID$_{node}$.

The node and edge structure allow us to visualise the Metanet as a graph, as shown in FIG. 13.

Domains, Naming and Locating Content Within the Metanet

The hierarchy of the Metanet graph allows rich domain-like structure to emerge. We interpret an orphan node as a top-level domain (TLD), a child of an orphan node as a sub-domain, a grandchild as a sub-sub-domain etc., and a childless node as an end-point. See FIG. 13.

The domain name is interpreted as ID$_{node}$. Each top-level domain in the Metanet may be thought of as a tree with the root being the orphan node and the leaves being the childless nodes. The Metanet itself is a global collection of trees which form a graph.

The Metanet protocol does not stipulate that any node contains content data, but leaf (childless) nodes represent the end of a directed path on the data tree, and thus will be used generally to store content data. However, content may be stored at any node in the tree. Protocol-specific flags, included in nodes as attributes, may be used to specify the role of nodes in a data tree (disk space, folders, files or permissioning changes).

Recall that the internet uses the Domain Name System (DNS) to associate human-readable names to Internet Protocol (IP) addresses. The DNS is in a sense decentralised, although in practice it is controlled by a small number of key players, such as governments and large corporations. Depending on your DNS provider the same name may take you to different addresses. This issue is inherent when mapping short human-readable names to computer generated numbers.

We assume that an equivalent distributed system exists that maps a human-readable top-level domain name to the decentralised index ID$_{root}$ of a root node. In other words, there exists a 1-1 function K that maps human-readable names to Metanet root node indexes, for example $$\kappa(\text{`bobsblog'})=ID_{bobsblog}(=H(P_{bobsblog}\|TxID_{bobsblog})).$$

The input to the left-hand-side is human-readable word, whereas the output on the right-hand-side is a hash digest, which will typically be a 256-bit data structure. Note that $P_{bobsblog}$ and TxID$_{bobsblog}$ are also not human readable in general. In the standard IP protocol this would be a map from www.bobsblog.com to the IP address of the corresponding domain within the network.

The map κ should be interpreted as a measure to ensure backwards-compatibility of the Metanet with the internet in replicating the human-readability of DNS-issued domain names, but the naming and addressing scheme that provides the structure of the Metanet is not explicitly dependent on this map.

Possible existing forms of the mapping function κ include the DNSLink system employed by Interplanetary File System (IPFS) or the OpenNIC service (https://www.openic.org). This mapping can be stored in an existing TXT record as part of the DNS. This is similar to a DNSLink in the IPFS—see https://docs.ipfs.io/guides/concepts/dnslink/. However, in general these sacrifice some element of decentralisation in order to provide a map that is 1-1—see https://hackernoon.com/ten-terrible-attempts-to-make-the-inter-planetary-file-system-human-friendly-e4e95df0c6fa Vanity Addresses The public key used as the address of a Metanet node is not a human-readable object. This can make searching, referencing and inputting activities error prone and slow for human users. However, it is possible to create human-recognisable public key addresses—vanity addresses $P_{vanity}$—which include a plaintext prefix that can be interpreted directly by a user. Vanity addresses are known in the prior art.

The difficulty in creating such an address depends on the character length of the desired prefix. This means that human-recognisable vanity addresses may be used as node addresses that rely only on the effort of the owner to create rather than on central issuance. For a given prefix there exist many distinct vanity addresses, due to the characters remaining in the suffix, and hence many node addresses can share a common prefix whilst still retaining uniqueness.

An example of a vanity address with a desirable prefix is
$P_{bobsblog}$: bobsblogHtKNngkdXEeobR76b53LETtpyT
Prefix: bobsblog
Suffix: HtKNngkdXEeobR76b53LETtpyT The vanity address above may be used to sense check the map from the name 'bobsblog' to the node index $ID_{bobsblog}$ and to aid the searchability of Metanet nodes by address. Note that the prefix is not unique here but the entire address itself is a unique entity.

The combination of a chosen address $P_{vanity}$ with a TxID that together form $ID_{node}$ is also beneficial as it means there is no central issuer of domain names (TxIDs are generated by decentralised proof-of-work) and the names are recoverable from the blockchain itself. Advantageously, there are no longer the points of failure that exist within the internet DNS.

Since Metanet domains already provide a permissions system (the public key) there is no need to issue a certificate to prove ownership. The use of a blockchain for this purpose has already been explored in namecoin (https://namecoin.org/) for example. In accordance with the present invention, however, there is no need to use a separate blockchain for this function as everything is achieved within one blockchain.

This significantly reduces the amount of resources (hardware, processing resources and energy) required by the invention in comparison to the prior art. It also provides an entirely different architecture in terms of apparatus and arrangement of system components.

An advantage of this naming system is that a user is able to identify a top-level domain in the Metanet by a memorable word (for example a company name) rather than a hash digest. This also makes searching for the domain faster as it is quicker to search for a keyword rather than a hash digest. It also reduces input errors, thus providing an improved searching tool for blockchain-stored data.

Given that we have a map from a domain name to a node index we can build up a resource locator similar to that of a Uniform Resource Locator (URL) for the internet. We will call this a Metanet URL (MURL), and takes the form MURL='mnp:'+'//domain name'+'/path'+'/file'.

Each of the components of a URL—protocol, domain name, path and file—have been mapped to the structure of a MURL, making the object more user-intuitive and enabling it to be integrated with the existing structure of the internet.

This assumes that each node has a name associated with its public key (address) that is unique at the level within the domain tree. This name is always the right-most component of the MURL for a given node. If two nodes at the same level in the tree have the same name then they will have the same public key and so the latest version is taken.

The following table gives an analogy between the Metanet protocol and the Internet Protocol:

TABLE

Summary of the analogies between the Internet and Metanet Protocols.

| Internet | Metanet |
| --- | --- |
| Website/file | Node |
| Owner | Public Key $P_{node}$ |
| IP Address (non-unique) | Node index (unique) $ID_{node} = H(P_{node}\|\|TxID_{node})$ |
| Domain structure | Node tree structure |
| Domain Name System | Map from root node name to node index |
| URL | MURL |
| http://www.bobsblog.com/path/file | mnp://bobsblog/path/file |

Searching the Metanet

We have defined an illustrative embodiment the Metanet graph structure such that each node has a unique index and may have a name attributed to it. This allows for content to be located using a MURL. In order to also enable quick search functionality, we allow for additional keywords to be attributed to a node.

The fixed attributes of a node are the index and index of parent node, and the optional attributes are the name and keywords.

```
Node attributes
{
    index:              H(P_node||TxID_node);
    index of parent:    H(P_parent||TxID_parent); (NULL if orphan)
    name:               'bobsblog';
    kwd1:               'travel';
    kwd2:               'barbados';
    .
    .
    .
}
```

In one example, a practical method for searching the Metanet may be to first use a block explorer to trawl through the blockchain and identify all transactions with the Metanet flag, check that they are valid Metanet nodes, and if so record their indexes and keyword in a database or other storage resource. This database can then be used to efficiently search for nodes with desired keywords. Once the index of the node(s) with the desired keywords is found its content can be retrieved from the block explorer and viewed.

By way of example, consider the $P_1$ branch of FIG. 14, where the nodes corresponding to public keys $P_0$, $P_1$ and $P_{1,1}$ represent a home page, topic page and sub-topic page respectively. These nodes are given the names 'bobsblog', 'summer' and 'caribbean', and their attributes are shown below

```
Home page node P_0
MURL: mnp://bobsblog
{
    index:              H(P_0||TxID_0);
    index of parent:    NULL
    name:               'bobsblog';
    kwd1:               'travel';
    kwd2:               'barbados';
    .
    .
    .
}
Topic page node P_1
MURL: mnp://bobsblog/summer
{
    index:              H(P_1||TxID_1);
    index of parent:    H(P_0||TxID_0);
    name:               'summer';
    kwd1:               'travel';
    kwd2:               'barbados';
    .
    .
    .
}
Sub-topic page node P_{1,1}
MURL: mnp://bobsblog/summer/caribbean
{
    index:              H(P_{1,1}||TxID_{1,1});
    index of parent:    H(P_1||TxID_1);
    name:               'caribbean';
    kwd1:               'travel';
    kwd2:               'barbados';
    .
    .
    .
}
```

In this example, the leaf nodes $P_{1,1,1}$ $P_{1,1,2}$ and $P_{1,1,3}$ are given the names 'beaches', 'nightlife' and 'food' respectively and are used to store separate blog posts. The full domain structure is shown on the diagram overleaf, including the MURL search path pertaining to each node in the tree.

We note that the Metanet can also incorporate a content addressable network (CAN) by storing a hash of the content stored by a node transaction as an additional attribute. This means Metanet nodes may also be indexed and searched for by content hash.

The naming and addressing methods described above provide numerous technical advantages over the prior art, including:

1. Public key addresses—The system uses the same public-private key pairs as the blockchain to assign node addresses. This means that the same set of keys are used for both management of cryptocurrency funds and permissioning of content data. This provides an efficient and secure solution.
2. Decentralised domains—The issuance of domain names is fully decentralised through the inclusion of the $TxID_{node}$, which can only be generated by proof of work. The domain names can also incorporate human-recognisable public keys $P_{vanity}$ (vanity addresses) which enable the fair distribution of desired domain public keys. Again, this solution provides enhanced efficiency and security.
3. Graph structure—The naming and addressing architecture specifies a graph that can be constructed from the subset of blockchain data comprising Metanet nodes. This design maps the complexity of the internet to the blockchain using an ordered structure such that it fully replicates its functionality and scalability whilst remaining secure.

Browser-Wallet Application

Recall that in the Metanet protocol all data lives directly on the blockchain itself. In this section we present embodiments of an illustrative computer application, which we will refer to herein for convenience only as a "browser-wallet", that can efficiently access, display and interact with Metanet data stored on the blockchain.

We will begin with a discussion of the core components and functionalities of how the browser-wallet interfaces with the distributed peer internet, before providing a more detailed description in the remainder of this section.

Overview

Components

The browser-wallet is an application intended to allow an end-user to interact with the Metanet infrastructure on the blockchain. This application should allow explorative searches of the Metanet graph for specific content embedded in trees. Additionally, the browser-wallet will handle retrieval, decryption, recombination and caching (optional) of content.

The browser-wallet application will combine these elements with cryptocurrency payment mechanisms by supporting a native (or external) wallet. The browser-wallet will comprise the following core elements, combined into a single computer application.

Blockchain search engine—Support for a third-party search engine to query Metanet nodes by a variety of indexes including $ID_{node}$, node name, keywords, block height and TxID.

Display window—Software that unpacks content returned to the browser by a full-copy blockchain peer. This covers decryption, recombination, caching and redemption of access tokens.

Cryptocurrency wallet—Dedicated key-management for currency of the blockchain. Can be native to the application or authorised to communicate and synchronise with external wallet (software or hardware). Able to write standard blockchain transactions as well as new Metanet node transactions. Can mediate on-chain purchase of access keys and access tokens.

Hierarchical, deterministic key management is leveraged for both cryptocurrency public keys and Metanet node addresses.

Access key/token wallet—Dedicated key-management for purchased access keys or tokens. Can receive purchased keys or tokens using cryptocurrency wallet but has no permissions over them. They may be hidden to the user to allow later expiry. This may be achieved through the use of a trusted execution environment. Timed-access can be secured by synchronising with the blockchain and querying current block height.

Functionality

The specification for the Metanet browser-wallet ensures the following functionalities of the application.
1. Hierarchical key-management—The keys used for controlling funds and managing Metanet trees (graphs) utilise the same hierarchical deterministic key infrastructure, reducing the burden on users to maintain key records for their Metanet content.
2. Pointing to an external cryptocurrency wallet—Ability to authorise and synchronise with an external (nonnative to application) wallet allows for additional security by removing the browser-wallet as a point of failure. The application can write blockchain transactions and require the signature of an external wallet that houses keys, delegating this responsibility to separate software or hardware.
3. Searching of Metanet content—The browser-wallet can support and query a third-party search engine whose functions may comprise crawling, indexing, servicing and ranking Metanet node transaction data in a global database. A database of OP_RETURN transactions containing the Metanet protocol flag may be constructed. See BitDB 2.0—https://bitdb.network/.
The search engine can serve the browser-wallet with a node index, which allows data to be found.
4. Reading and writing data to blockchain—In addition to using search engines and full-nodes to serve the browser with content, the support for a cryptocurrency wallet also allows for content to be written into the Metanet directly from the browser-wallet.
5. Decompression and decryption of data—The browser-wallet handles decryption keys and can perform decompression on Metanet content in-situ.
6. Caching node identities ($ID_{node}$)—Unique node identities can be cached locally for more efficient lookup and querying.
7. Bypassing web-servers—Given a node index, the browser-wallet can query any full-copy member of the peer-to-peer (P2P) blockchain network for the content located at a node. Because the Metanet lives on-chain, any full-copy peer must have a local copy of the node and its content.
This means that the user's browser-wallet need only query a single peer, which can be done directly and without the need for an intermediary web-server. FIG. 15 shows the schematic for the browser-wallet and how its core functions are split across different components of the application.

Blockchain Search Engine

Search Engines—Existing Technologies

Search engines (SEs) as known in the prior art rely on powerful web crawlers to locate, index and rank web content according to the user queries. (The same underlying principles can be extended to a third-party Blockchain SE that crawls the Metanet).

SEs identify relevant HTML metatags and content through a search of the keywords in the query. The results of the crawl are subsequently indexed where any embedded images/videos/media files are analysed and catalogued. The most relevant results from the index are then ranked programmatically, taking into consideration the user's location, language and device.

A typical SE should have the following functionality:
1. Crawling—Identify internet data and crawl through the relevant metadata, such as domain names, linked pages and related keywords. New internet content is discovered through existing content and also crawled for any relevant information.
2. Indexing—Content data are analysed and catalogued. This information is stored in the database.
3. Servicing and ranking—Content indexes are ranked in order of relevance to the users' queries.

Block Explorers

The closest blockchain analogue to an internet search engine (SE) is a blockchain explorer, sometimes referred to as a 'block explorer' or 'blockchain browser'. Blockchain explorers are web applications which enable user-friendly queries of a blockchain, at a high level, and function similarly to web browsers but are connected to a blockchain rather than the internet. See https://en.bitcoin.it/wiki/Block-_chain_browser.

In most cases, these explorers allow blocks (indexed by hash of the block header), transactions (indexed by TxID), addresses and unspent transaction outputs (UTXOs) to be taken as inputs and searched for. Many explorers also offer their own application programming interfaces (APIs) for retrieving raw transaction and block data. See https://block-explorer.com/api-ref.

Block explorers, while varying in their capabilities, are generally useful for cataloguing transactions and displaying their basic information—such as transacted currency values, confirmations and histories of coins and addresses—in a form that is easy for users to digest. Many explorers, such as Bitcoin.com https://explorer.bitcoin.com/bch and Blockchain.com https://www.blockchain.com/explorer also allow the individual input and locking scripts for transactions to be viewed, although there are inconsistencies between how these and more advanced sites like Blockchair https://blockchair.com/ choose to provide this information.

Recently there have been many extensions of basic blockchain explorers used to run web applications based on blockchain data. These applications, such as Memo.cash https://memo.cash/protocol and Matter https://www.mt-tr.app/home act like block explorers that catalogue and organise blockchain transactions that contain specific protocol identifiers, as well as displaying data encoded within those particular transactions.

However, there are two important issues with using blockchain explorers that are addressed by embodiments of the present invention:
1. Universality—There is currently no industry-wide standard for browsing content data that is stored in transactions. Content data refers to any data that does not pertain to the protocol used for creating and securing the underlying blockchain.
2. Keyword searching—Content data stored in transactions needs to be retrievable by human-readable keywords. This is not generally a function of current block explorers as they are used to query the protocol-based properties of transactions, such as block height, TxID and addresses rather than taking keywords as search inputs. (However, some e.g. Blockchair can search for words if they are directly included in the script of the transaction).

Importantly, the powerful naming and addressing structure of the present invention, as discussed above, facilitates and enables the construction of a more sophisticated blockchain explorer than known in the art.

Proposed Metanet Search Engine

The browser-wallet application communicates with a third-party search engine for discovery of node identities ($ID_{node}$). It is envisaged that such a third-party may provide a powerful and versatile service that replicates the capabilities of existing internet search engines.

A Metanet search engine third-party maintains a database of all Metanet transactions mined into the blockchain identifiable by the Metanet protocol flag. This database can catalogue all Metanet nodes by a range indexes including $ID_{node}$, node names, key words, TxID and block height.

There already exist services, such as Bit DB https://bitdb.network/, which continuously synchronise with the blockchain and maintain transaction data in a standard database format. The browser-wallet offloads the responsibilities of crawling, indexing, servicing and ranking Metanet transactions to such a third-party and makes a connection to their services when locating content stored on the Metanet graph.

Efficiency savings may be made by having a database that is dedicated to Metanet data only. Unlike Bit DB this would not store the data associated with all transaction, only those containing the Metanet flag. Certain databases, such as non-relational databases like MongoDB, may be more efficient at storing the graph structure of the Metanet. This would allow for faster querying, lower storage space, and more efficiently associate related content within Metanet domains.

FIG. 16 shows how the browser-wallet interacts with a third-party search engine when a user searches for content within the Metanet infrastructure. Importantly, it should be noted that, in contrast with the Internet, no routing is necessary and thus the invention provides important advantages in respect of efficiency, speed, processing and required resources.

The process is as follows
1. The end user inputs keywords into the browser-wallet search bar.
2. The browser-wallet sends the keyword query to a third-party SE.
3. The SE checks the keywords against its database and returns $ID_{node}$ for any Metanet nodes containing relevant content. The third-party can also return other indexes on each node to the user, as well as providing suggestions for related content.
4. The browser-wallet uses the node identity and the domain name associated with it to construct a MURL.
5. The browser-wallet requests the content belonging to the specified node from any network peer with a full copy of the blockchain.
6. The network peer serves the browser-wallet with the requested content. Because the peer has a copy of the blockchain, they must also have a copy of the content and so only one request is made, and it is never forwarded to other network peers.

It is emphasised that the third-party SE only has the responsibility of indexing and maintaining records of the attributes of Metanet nodes, while the raw content data stored on the nodes is instead stored by network peers (e.g. full-copy peers, miners, archives) with a full copy of the blockchain.

Content Display—Metanet Browser

The browser-wallet application emulates the same front-end capabilities that any typical web-browser should provide. These functions include, but are not limited to:
1. Searching—Provide access to a search engine (SE) for locating content.
2. Retrieval—Communicate with a server to facilitate the transfer of content using a known protocol e.g. Hypertext Transfer Protocol (HTTP).
3. Interpreting—Parsing raw code (e.g. in JavaScript) and executing.
4. Rendering—Efficient display of parsed content to be viewed by the end user.
5. User interface (UI)—Provide an intuitive interface for a user to interact with content, including action buttons and mechanism for user-input.
6. Storage—Local temporary storage capacity for caching internet content, cookies etc., to improve repeated access to content.

In certain embodiments, the software component of the browser-wallet application responsible for acting as a web-browser is able to perform the above functions on Metanet content embedded in the blockchain that is both searchable (using SEs) and retrievable (from peers) using their attributes.

Recombination, De-Compression and Decryption

In accordance with certain embodiments of the invention, the web-browser software component of the browser-wallet application is able to handle all operations that need to be performed on given Metanet content. There are many such operations that need to be performed in general, but we assume that at least the following are executed by the application using the Metanet protocol and infrastructure.

Recombination—In the case that Metanet content needs to be split up and inserted into multiple separate node transactions, the application will request the content from all relevant nodes and reconstitute the original content. The ordering and structure of the splintered content can be encoded using additional flags in each node's attributes.

Decompression—Where content data is stored on the blockchain in a compressed form, it should include a flag to indicate to the browser-wallet which standard compression scheme has been used. The application will decompress content according to this flag.

Decryption—Where content is encrypted a flag should be used to signify the encryption scheme. The application will locate a key from its decryption key wallet (as discussed below) and decrypt content data for use according to the encryption scheme used.

In performing these operations on content data, flags can be used to signify to the browser-wallet that a given operation needs to be performed. This generalises to any other operation, for which a suitable <operation_flag>can be included as part of the attributes of nodes to which the operation applies.

Caching

The caching of local files and cookies is a common and important function of typical web-browsers. The browser-wallet application also uses local storage in a similar way in order to optionally keep a record of $ID_{node}$ and other node attributes that pertain to content of interest. This allows more efficient lookup and retrieval of content from frequently-visited Metanet nodes.

The Metanet solves the problem inherent with caching internet data that it is mutable and can be changed or censored by web-browsing software depending on the provider. When caching Metanet data a user can always easily verify that it is in the same state as when originally included as an immutable record on the blockchain.

Cryptocurrency Wallet

Hierarchical Deterministic Key Management

Deterministic keys Dk are private keys initialized from a single "seed" key (See Andreas M. Antonopoulos, Chapter 5 in "Mastering Bitcoin" O'Reilly $2^{nd}$ Ed., 2017, pp. 93-98). The seed is a randomly generated number that acts as a master key. A hash function can be used to combine the seed with other data, such as an index number or "chain code" (see HD Wallets—BIP-32/BIP-44), to derive deterministic keys. These keys are related to one another and are fully recoverable with the seed key. The seed also permits the easy import/export of a wallet between different wallet implementations, giving an additional degree of freedom if the user wishes to use an external wallet in conjunction with the Metanet browser-wallet.

A hierarchical deterministic (HD) wallet is a well known derivation method of deterministic keys. In HD wallets, a parent key generates a sequence of children keys, which in turn derive a sequence of grandchildren keys, and so on. This tree-like structure is a powerful mechanism for managing several keys.

In a preferred embodiment, a HD wallet can be incorporated into the Metanet architecture illustrated in FIG. 16. Advantages of using HD wallets include:
1. Structure Additional organisational meaning can be expressed using different branches of subkeys for different purposes. For example, a user could dedicate different branches (and their corresponding subkeys) to different types of data.
2. Security Users can create a sequence of public keys without the corresponding private keys, making HD wallets functional in a receive-only capacity and suitable for use on insecure servers. Also, since fewer secrets need to be stored there is a lower risk of exposure.
3. Recovery If keys are lost/corrupted then they can be recovered from the seed key.

Native (Internal) and External Wallet Support

Advantageously, embodiments of the invention can directly merge the functionality of traditional web-browsers with one or more cryptocurrency wallets. This is fundamentally how the Metanet combines the payment for "internet" content with its delivery to the end user.

To achieve this, embodiments of the browser-wallet may have a dedicated, in-built software component that operates as a cryptocurrency wallet. This wallet is native the application itself and can be used to manage cryptocurrency private keys and authorise transactions as payment for Metanet content within the browser-wallet itself.

This means that the browser component of the application can prompt the wallet component to authorise a payment that is required—by purchasing a decryption key, access token or otherwise—to view Metanet content. The application does not need to invoke an external third party to process the payment, and thus the Metanet content of interest is consumed by the application and paid for in-situ.

External Wallets

The same advantages and functionality can be achieved by embodiments of the application if a user wishes to instead manage or keep their cryptocurrency private keys on an external wallet (software or hardware) or even use multiple wallets. This may be performed in lieu of, or in conjunction with, the application's native wallet.

In such embodiments, the application establishes a link or pairing with an external wallet(s), and synchronises with it, but does not store private keys in the browser-wallet itself. Instead, when the browser component prompts a payment to be made for content, the application requests an authorisation by digital signature from the external wallet of choice. This authorisation is made by the user and the browser-wallet can broadcast the transaction and view the paid content.

Reading and Writing Metanet Transactions

An intrinsic advantage of the Metanet is that it uses the same data-structure—the blockchain—to record both payments and content data. This means that software wallets can be used to write content data to the Metanet infrastructure in addition to creating transactions that are purely based on the exchange of cryptocurrency.

The native wallet built-in to the application is able to write transactions to the blockchain that are more complex than typical simplified payment verification (SPV) clients—see https://bitcoin.org/en/glossary/simplified-payment-verification. The wallet allows users to choose to write a Metanet node transaction to the blockchain directly from the application by selecting content data, from their computer, to be embedded in the blockchain.

As the browser-wallet application has a user interface (UI) it allows for the wallet component to create and broadcast transactions that include content data that has been constructed either in the browser-component or on the user's computer beforehand. This capability would be far more difficult to achieve for a purpose-built wallet to handle on its own.

Access Key/Token Wallet

Recall from above that, built in to the Metanet protocol, is the ability to encrypt content using an ECC keypair or AES symmetric key, and the ability purchase the corresponding decryption key or token. We will refer to these as access keys or access tokens.

Such keys/tokens grant the user permission to view or edit content (either single use or multi-instance use) and play a distinct role from keys that control the users cryptocurrency wallet (although the same key may be used for both purposes if desired). For this reason, it is advantageous to introduce a new wallet, separate from the application's native cryptocurrency wallet, that is used for storing and managing access keys and tokens.

One can also introduce the notion of timed access to Metanet content by allowing access keys/tokens to be burned after a certain time period. This can be achieved by requiring that access keys/tokens are stored in a Trusted Execution Environment (TEE) and are not directly accessible to the user.

The fact that access keys/tokens may be "burned" is also a motivating factor for not storing them in the cryptocurrency wallet to ensure there is no risk of cryptocurrency private keys being burned.

In a similar way to the cryptocurrency wallet, decryption keys and access tokens can be stored and managed deterministically to facilitate efficient handling and deployment. Decryption keys (e.g. ECC private keys) can be generated and recovered by subsequent additions to a master key, while access tokens can be reconstructed using a hash chain that is seeded by some initial token.

It is important to make the distinction here that the cryptocurrency wallet handles the deterministic key generation for key pairs that are used in transacting with other users and creating new Metanet nodes, whereas a key/token wallet(s) handles keys and tokens that have been purchased by the cryptocurrency wallet.

Block Height Permissioning

Timelocks can be included in the bitcoin script language to enable block height permissioning. The op_code OP_CHECKLOCKTIMEVERIFY (CLTV) sets the block height at which a transaction output (UTXO) is permissible for spending.

The advantages of block height permissioning are two-fold:
1. Version control—In the Metanet Protocol, the newest version of a node can be identified from the node at the greatest block height. The browser-wallet can be set up to only display the most recent version of a file by block height, allowing proof-of-work version control.
2. Timed access—The Browser-wallet application can periodically burn the decryption keys atomically purchased by the user. This ensures that viewers can only access content data during the time period for which they have paid. Cloning of the decryption keys can be prevented by storing them in a trusted execution environment (TEE). Moreover, the atomic swap involves the purchase of a deterministic key Dk (for decryption of the content data). Although this deterministic key is publicly visible, the TEE can be used to sign for the combination of Dk and a securely enclaved private key.

The browser-wallet can be arranged to synchronise with the current state of the blockchain in order to use block height as its own proxy for time, rather than relying on any external clock or third-party time oracle.

Bypassing Web-Servers

The invention allows a new mechanism for a browser (client) and a web server to communicate and exchange information over the distributed peer internet that bypasses domain name system (DNS) servers and typical network routing procedures. See http://www.theshulers.com/whitepapers/internet_whitepaper/. The invention provides a new network architecture, from which the browser-wallet application can be served content, comprising peers that maintain a full-copy of the blockchain.

Local Full-Copy Peers

Consider a system of local peers in each geographical area e.g. postcode, town, city. We assume that within this local network at least one peer maintains a full-copy of the blockchain, which we will refer to as a Local Full-Copy Peer (LFCP). For our purposes, an LFCP need only store the blockchain transactions that include the Metanet flag, but we do not limit them to this.

All users default to sending 'get' requests to LFCPs. As the peers maintain a complete and up-to-date copy of the entire blockchain, all requests can be served because any node ID that is queried will be available to the LFCP. Note that a Metanet search engine may also act as an LFCP if the SE is powerful and large enough to both store Metanet content and perform the main functions of a typical SE.

In the simplest case, every LFCP will have the same storage and disk space overheads as they will all need to be able to store the full blockchain (around 200 GB at the time of writing). The distinction between each LFCP is that they should scale their capability to respond to the demands of local requests from Metanet users. So, if each Metanet user in the world queries their closest LFCP by default, each LCFP should aim to scale in their operational capacity to meet their local demand. Densely-populated areas like cities will require LFCP operations comprising of many clustered servers, while sparser areas like small towns will require smaller LCFP operations.

It is important to note that the disk space requirement is universal, while the CPU requirement for each LFCP adapts to local network demand. This is an example of an adaptable network, such as Freenet—see https://blockstack.org/papers/.

One advantage of such a system is that users only need to make a single (local) connection to their LFCP when retrieving the content associated with a given $ID_{node}$. There is no need for the LFCP to forward the request to other peers as they are guaranteed to be able to serve the required content themselves.

The Metanet provides many advantages over the internet—such as decentralisation and deduplication—that are similar to other peer-to-peer (P2P) file-sharing services like IFPS. However, the Metanet improves on these existing P2P models by ensuring immutability and, crucially, removing the need to flood the network with requests for given content.

The Metanet infrastructure is also robust to the compromise of any one LFCP by employing a network of these peers. This means that if a LFCP is disabled then the end user simply defaults to using their next nearest LFCP. This can be made more efficient if LFCPs communicate with each other to indicate which nearby peers are below or above capacity in terms of requests at any given time. This can allow users to send their request to the most appropriate peer and establish dynamic equilibria in the request distribution between nearby LFCPs.

Global Full-Copy Peers

We now consider a scenario when the universal disk space requirement becomes too great for smaller peers, which may happen as the Metanet portion of the blockchain scales and grows with adoption.

In this case smaller LFCPs should use their disk space capacity to store Metanet node transactions based on a popularity system (there are existing techniques for ranking content by request volume and nature). This means that LFCPs now tailor both their CPU (for request handling ability) and their storage allocation (for content-serving ability) to suit their local geographic demands both in volume and nature of content.

In order to address the fact that LFCP are now unable to store all Metanet transaction content the concept of a Global Full-Copy Peer (GFCP) can be utilised. A GFCP is a full-copy peer that has the following properties:
1. A GFCP grows its disk space capacity in order to maintain a full-copy of the blockchain at all times.
2. A GFCP has substantial CPU resources such that it can handle significantly more requests than an LFCP. A global full-copy peer should be able to handle a sudden increase in demand should many LFCPs become compromised.

There are two main functions of a GFCP. First, to act as a failsafe for user requests of Metanet content in times of overflow requests from LFCPs. Second, GFCPs act as archive peers to store all Metanet content mined historically, which ensures that any Metanet node content can be accessed even if many LFCPs omit some content from their local storage provisions.

Global Data Banks

The concept of a GFCP is a powerful one and illustrates how the overall architecture of the Metanet provides a solution to an existing problem; that of creating all-encompassing, global data banks.

Before now, it has not been possible to safely construct a universal and globally-accessible data bank because it would need to be maintained by a central authority. This central authority injects both a point of failure and of trust into the system. Crucially, if one organisation is relied upon to store and maintain all internet data then we need to trust the facts that they are doing so correctly and legitimately, without corrupting the information.

With the Metanet infrastructure, we have effectively removed both of these problems, those of trust and of centrality, from the concept of a global data centre. Now, such a GFCP can be created because they are only relied upon to provide the required disk space for storage and not to verify and authenticate the information to be stored.

With the Metanet, the process of verifying what is stored is done by miners and hence universal, global data banks can be trusted because they cannot corrupt blockchain information. The GFCP does not need to be trusted and need only provide storage. The fact that all GFCPs can store the same information, that is always verifiable and provable against the blockchain itself, means that it can be replicated across many such GFCPs. This means me have also solved the issue of having a single point of failure by enabling many global data banks to exist in parallel and provably store the same information.

FIG. 17 shows a system of two LFCPs and one GFCP and illustrates how each peer can support the other in a network that is robust to the compromise of individual peers.

The aspects of the invention which can be implemented in embodiments of the browser-wallet application described above provide numerous distinguishing features and advantages over the prior art, including but not limited to:

1. Deterministic keys—Hierarchical deterministic key management for both cryptocurrency and Metanet addresses is performed in the same wallet component of the application. This allows organisation of keys with multiple functions that reduces their storage requirements and enables key recovery.
2. Payment mechanism—The application allows consumers to pay merchants directly without needing to point to another application or third-party payment service that would conventionally authenticate and provide trust. This allows the purchase and delivery of digital content to take place via the same blockchain platform. The application inherits the advantages of bitcoin payments including low value exchanges or more complex transactions involving multiple parties.
3. Bypassing web-servers—The application facilitates the bypassing of traditional web-servers, which would conventionally process a high volume of traffic, requests and routing. This is because the application need only request content from a single LFCP, which is guaranteed to serve the user without needing to forward the request to other LFCPs. This reduces the overall traffic volume as well as the completion time of each request.
4. Timed access—The application facilitates timed access to content by synchronising with the blockchain and using it to enforce access permissions based on its current state. This removes the need for third party services to monitor a users' privileges over time while protecting the rights of the original owner.

Use Case—Decentralised App Store (Swapp Store)

The first use case presented here (for illustrative purposes only) for the Metanet architecture is for the decentralised payment for and distribution of applications (apps).

We consider a scenario in which an app developer Alice and a consumer Bob wish to transact with each other. This transaction will take the form of an atomic swap in which money is exchanged for a secret key that grants Bob access to the application data. The encrypted application data is already public as part of a Metanet node transaction.

An atomically-swapped application is known as a Swapp. A third-party platform (Swapp store) may be used for cataloguing and advertising applications that exist on the Metanet, but the payment for and transfer of the access key to a user such as Bob does not need to involve any third party and can be done directly between merchant and consumer.

The following section details a process that may be used for buying and selling Swapps from the creation of an app by Alice to its deployment by Bob. Throughout the process, Alice and Bob will use their respective browser-wallets to interact with the Metanet.

Publishing

1. Alice writes an application. The data that constitutes this application is the content denoted by <App>. She also encrypts it sa <e(App)> using a secret key $S_k$.
2. Alice creates a node transaction, $ID_{AliceApp}$ to set up her first Metanet domain (tree). She generates 1AliceAppHtKNngkdXEeobR76b53LETtpy ($P_{AliceApp}$) to be used as the node address.
3. Alice then creates children of the first node to form a tree that corresponds to a Metanet library of her applications. Alice's tree domain is shown in FIG. 18.
One of the leaf nodes on this tree is the node corresponding to her application <App> with index $ID_{App}$. In this node, Alice inserts the encrypted application data <e(App)> into the input script (scriptSig) of the node. The app data is encrypted using the Koblitz method using a secret key $s_k$.
This node transaction is shown below.

| TxID$_{App}$ | |
| --- | --- |
| Input | Output |
| <Sig $P_{Puzzle}$> | OP_RETURN <Metanet Flag> <$P_{App}$> |
| <$P_{Puzzle}$> <e(App)> | <TxID$_{Puzzle}$> |
| OP_DROP | |

4. Alice broadcasts $ID_{AliceApp}$, $P_{AliceApp}$ and domain name 'AliceApp' publicly. This can be via social media, an internet website or by using a third-party Metanet website.

Purchasing

1. Bob wants to download a puzzle game and sees Alice's app listed on a Metanet website (Swapp store) that he views on his browser-wallet.

2. Bob then communicates with Alice, using information from the website, and sets up an atomic swap. The swap is designed such that Bob will pay an agreed price in Bitcoin to Alice and Alice will reveal the secret key $s_k$ or neither event occurs.
3. The atomic swap is completed and Bob's browser-wallet stores the secret key $s_k$ in its access key/token wallet.

Deployment

Bob now has the key $s_k$ that will allow him to decrypt the application data Alice published previously. In order to download the app and deploy it Bob does the following.
1. Bob uses a Metanet search engine (SE) to find the MURL associated with the encrypted app data <e(App)>. He uses the keywords 'AliceApp' and 'App' as input to the search bar in his browser-wallet. The third-party SE resolves the query and returns the following MURL:

mnp://aliceapp/games/puzzle/app

This locator corresponds to the unique Metanet node $ID_{App}$ which includes the encrypted app data in its input script.
2. Bob's browser wallet receives this MURL and sends a request to the nearest appropriate LFCP. This peer serves Bob with the requested data <e(App)>.
3. The browser-wallet processes the data according to the attributes of $ID_{App}$. This includes using the secret key $s_k$ to decrypt the application data and process <App>.
4. Bob downloads the application <App> from his browser to his computer. Bob can now deploy the application locally without having to re-purchase access.

FIG. 19 illustrates the entire process outlined in the above illustrative use case. The flow chart shows two action branches, Alice's (starting on the left hand side) and Bob's (starting on the right hand side). The branch corresponding to Alice shows the initial publishing phase and Bob's shows the phase of setting up the purchase via atomic swap.

On Bob's branch, he broadcasts the following transaction $TxID_{Bob}$ as the atomic swap set-up phase:

| $TxID_{Bob}$ | | | |
|---|---|---|---|
| Inputs | | Outputs | |
| Value | Script | Value | Script |
| x BCH | <Sig $P_B$> <$P_B$> | x BCH | [Private Key Puzzle $P_k$, $r_0$] [CheckSig $P_A$] |

In this transaction, the output is locked with a private key puzzle that requires the secret decryption key $s_k$ to be revealed to Bob in order for Alice to spend.

Alice and Bob's branches in this diagram converge at the point where Alice successfully completes the atomic swap transaction. This is achieved when Alice broadcasts the transaction $TxID_{Alice}$:

| $TxID_{Alice}$ | | | |
|---|---|---|---|
| Inputs | | Outputs | |
| Value | Script | Value | Script |
| x Bitcoin | <Sig $P_A$> <$P_A$> <Sig $P_1$, $r_0$> <$P_1$> | x Bitcoin | [CheckSig $P_A$] |

As soon as this transaction is broadcast, Alice and Bob's action branches diverge once more. Alice receives payment of x Bitcoin while Bob receives the secret decryption key $s_k$ and is able to retrieve and decrypt Alice's application from the Metanet.

Turning now to FIG. 20, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 20, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended.

Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 20 is intended only as a specific example for purposes of illustrating the preferred embodiment of the device. Many other configurations having more or fewer components than the system depicted in FIG. 20 are possible.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method including the step of processing at least one blockchain transaction (Tx) comprising a transaction ID (TxID) that is required for the at least one blockchain transaction (Tx) to be valid in accordance with a first blockchain protocol, the at least one blockchain transaction (Tx) also comprising an output which includes:
   a protocol flag which indicates that the at least one blockchain transaction is formed in accordance with a further protocol other than the first blockchain protocol;
   a discretionary public key (DPK); and
   a discretionary transaction ID (DTxID),
      wherein the discretionary public key (DPK) and the discretionary transaction ID (DTxID) are part of the further protocol rather than required by the first blockchain protocol.

2. The method according to claim 1, wherein the transaction (Tx) further comprises:
   a portion of data, or a reference to a portion of data.

3. The method according to claim 2, wherein:
   i) the portion of data or reference to a portion of data is provided in the output of the at least one blockchain transaction; and/or
   ii) the portion of data or reference to the portion of data, the protocol flag, the discretionary public key (DPK) or the discretionary transaction ID (DTxID) are provided within a locking script associated with the output.

4. The method according to claim 2, wherein the portion of data, reference to the portion of data, the protocol flag, the discretionary public key (DPK) and/or the discretionary transaction ID (DTxID) are provided within the at least one blockchain transaction (Tx) at a location following a script opcode for marking an output as invalid for subsequent use as an input to a subsequent transaction.

5. The method according to claim 1, wherein:
   the at least one blockchain transaction (Tx) further comprises one or more attributes.

6. The method according to claim 5, wherein:
   the one or more attributes comprises a keyword, tag, or identifier associated with:
      i) a portion of data provided within or referenced within the at least one blockchain transaction (Tx); and/or
      ii) the at least one blockchain transaction (Tx).

7. The method according to claim 1, wherein the at least one blockchain transaction (Tx) further comprises an input including:
   a parent public key (PPK) associated with a logical parent transaction (LPTx), wherein the logical parent transaction (LPTx) is identified by the discretionary transaction ID (DTxID); and
   a signature generated using the parent public key (PPK).

8. The method according to claim 7, and further comprising the step of:
   using the discretionary public key (DPK) and the transaction ID (TxID) to identify the transaction (Tx) or the logical parent transaction within a blockchain.

9. The method according to claim 1, wherein the protocol flag is associated with and/or indicative of a blockchain-based protocol for searching for, storing in, and/or retrieving data in one or more blockchain transactions.

10. The method according to claim 9, wherein the blockchain-based protocol is a tier-2 protocol that does not modify the protocol or consensus rules of the underlying blockchain.

11. A computer-implemented method comprising the step of:
   associating a discretionary public key (DPK) and a discretionary transaction ID (DTxID) with an output of a blockchain transaction (Tx), wherein:
   the blockchain transaction comprises a transaction ID (TxID) that is required for the blockchain transaction to be valid in accordance with a first blockchain protocol;
   and the discretionary public key (DPK) and the discretionary transaction ID (DTxID) are part of a further protocol rather than required by the first blockchain protocol; and
   searching for the blockchain transaction (Tx) based on the discretionary transaction ID (DTxID) and the discretionary public key (DPK).

12. The computer-implemented method according to claim 11, and further comprising the step of:
   accessing or otherwise processing a portion of data provided within or referenced from the blockchain transaction (Tx).

13. A computer-implemented system comprising:
   a processor; and
   memory including executable instructions that, as a result of execution by the processor, cause the computer-implemented system to at least process at least one blockchain transaction (Tx) comprising a transaction ID (TxID) that is required for the at least one blockchain transaction to be valid in accordance with a first blockchain protocol, the at least one blockchain transaction (Tx) comprising an output which includes:
      a protocol flag which indicates that the at least one blockchain transaction is formed in accordance with a further protocol other than the first blockchain protocol;
      a discretionary public key (DPK); and
      a discretionary transaction ID (DTxID),
         wherein the discretionary public key (DPK) and the discretionary transaction ID (DTxID) are part of the further protocol rather than required by the first blockchain protocol.

14. The computer-implemented system according to claim 13, wherein the at least one blockchain transaction (Tx) further comprises a portion of data, or a reference to a portion of data.

15. The computer-implemented system according to claim 13, wherein the at least one blockchain transaction (Tx) further comprises one or more attributes.

16. The computer-implemented system according to claim 13, wherein the executable instructions further include instructions that further cause the computer-implemented system to perform:
   associating a discretionary public key (DPK) and a discretionary transaction ID (DTxID) with the output of the at least one blockchain transaction (Tx), wherein:
      the at least one blockchain transaction comprises a transaction ID (TxID) required for the at least one blockchain transaction to be valid in accordance with the first blockchain protocol; and
      the discretionary public key (DPK) and the discretionary transaction ID (DTxID) are part of a further protocol rather than required by the first blockchain protocol; and
   searching for the at least one blockchain transaction (Tx) based on the discretionary transaction ID and the discretionary public key.

17. The computer-implemented system according to claim 13, wherein the executable instructions further include instructions that further cause the computer-implemented system to perform accessing or otherwise processing a portion of data provided within or referenced from the transaction (Tx).

18. A non-transitory computer-readable storage medium for processing at least one blockchain transaction (Tx) comprising a transaction ID (TxID) that is required for the at least one blockchain transaction to be valid in accordance with a first blockchain protocol, the non-transitory computer-readable storage having stored thereon executable instructions that, as a result of being executed by a processor of a computer system, cause the computer-implemented system to at least perform processing of the at least one blockchain transaction (Tx),
   wherein the at least one blockchain transaction comprises an output which includes:
      a protocol flag which indicates that the at least one blockchain transaction is formed in accordance with a further protocol other than the first blockchain protocol;
      a discretionary public key (DPK); and
      a discretionary transaction ID (DTxID),
         wherein the discretionary public key (DPK) and the discretionary transaction ID (DTxID) are part of the further protocol rather than required by the first blockchain protocol.

19. The non-transitory computer-readable storage medium according to claim 18, wherein the executable instructions further cause the computer-implemented system to at least provide:
   i) the portion of data or reference to a portion of data in the output of the transaction; and/or
   ii) the portion of data or reference to the portion of data, the protocol flag, the discretionary public key (DPK) or the discretionary transaction ID (DTxID) within a locking script associated with the output.

20. The non-transitory computer-readable storage medium according to claim 18, wherein the executable instructions further cause the computer-implemented system to at least perform associating a discretionary public key (DPK) and a discretionary transaction ID (DTxID) with the output of the at least one blockchain transaction (Tx), wherein:
   the at least one blockchain transaction comprises a transaction ID (TxID) required for the at least one blockchain transaction to be valid in accordance with the first blockchain protocol; and
   the discretionary public key (DPK) and the discretionary transaction ID (DTxID) are part of a further protocol rather than required by the first blockchain protocol; and searching for the at least one blockchain transaction (Tx) based on the discretionary transaction ID and the discretionary public key.

* * * * *